(12) United States Patent
Booher et al.

(10) Patent No.: US 11,590,522 B2
(45) Date of Patent: Feb. 28, 2023

(54) SPRAYING SYSTEMS, KITS, VEHICLES, AND METHODS OF USE

(71) Applicant: Smart Apply, Inc., Indianapolis, IN (US)

(72) Inventors: Steven R. Booher, Carmel, IN (US); Gary A. Vandenbark, Greenfield, IN (US); Mike Hilligoss, Zionsville, IN (US)

(73) Assignee: SmartApply, Inc., Indianapolis, IN (US)

(*) Notice: Subject to any disclaimer, the term of this patent is extended or adjusted under 35 U.S.C. 154(b) by 589 days.

(21) Appl. No.: 16/773,352

(22) Filed: Jan. 27, 2020

(65) Prior Publication Data

US 2020/0156100 A1    May 21, 2020

Related U.S. Application Data

(63) Continuation-in-part of application No. 16/274,833, filed on Feb. 13, 2019, now Pat. No. 10,869,423.

(Continued)

(51) Int. Cl.
*A01M 7/00* (2006.01)
*B05B 12/12* (2006.01)
(Continued)

(52) U.S. Cl.
CPC .......... *B05B 12/12* (2013.01); *A01M 7/0089* (2013.01); *B05B 1/20* (2013.01); *B05B 1/3053* (2013.01);
(Continued)

(58) Field of Classification Search
CPC ....... B05B 12/12; B05B 12/04; B05B 1/3053; B05B 1/20; A01C 23/007; A01C 23/047; A01M 7/0089; A01B 79/005
See application file for complete search history.

(56) References Cited

U.S. PATENT DOCUMENTS 3,782,634 A    1/1974 Herman
3,933,277 A    1/1976 Volat et al.
(Continued)

OTHER PUBLICATIONS

USPTO, International Search Report and Written Opinion, Form PCT/ISA/237, "Spraying Systems, Kits, Vehicles, and Methods of Use," Serial No. PCT/US21/15000, dated Apr. 9, 2021.
(Continued)

*Primary Examiner* — Tuongminh N Pham

(57) ABSTRACT

Kits for vehicles may include pulse-width-modulated solenoids configured to selectably turn individual nozzle assemblies on and off and vary their flow rates when installed in fluid communication with the nozzle assemblies, one or more wirelessly-controllable solenoid controllers, a wiring harness to electrically connect the pulse-width-modulated solenoids to the controller(s), a wirelessly-communicating GPS antenna system, a LiDAR sensing system which may be wirelessly-communicating, associated wiring and bracketry to connect the kit with a vehicle, and a mobile device configured to wirelessly cause the one or more controllers to turn individual nozzle assemblies on and off and vary their flow rates based on sensed data and/or recorded data, in view of user-selected criteria.

33 Claims, 20 Drawing Sheets

Related U.S. Application Data

(60) Provisional application No. 62/630,139, filed on Feb. 13, 2018, provisional application No. 62/713,457, filed on Aug. 1, 2018.

(51) Int. Cl.
    B05B 1/30      (2006.01)
    B05B 1/20      (2006.01)
    B05B 12/04     (2006.01)
    A01C 23/04     (2006.01)
    A01C 23/00     (2006.01)

(52) U.S. Cl.
    CPC ............ *B05B 12/04* (2013.01); *A01C 23/007* (2013.01); *A01C 23/047* (2013.01)

(56) References Cited

U.S. PATENT DOCUMENTS

| | | |
|---|---|---|
| 4,121,767 A | 10/1978 | Jensen |
| 4,260,107 A | 4/1981 | Jackson |
| 4,523,280 A | 6/1985 | Bachman |
| 4,530,463 A | 7/1985 | Hiniker et al. |
| 4,553,702 A | 11/1985 | Coffee et al. |
| 4,630,773 A | 12/1986 | Ortlip |
| 4,703,891 A | 11/1987 | Jackson et al. |
| 4,967,957 A | 11/1990 | Bachman |
| 4,991,341 A | 2/1991 | Douglas |
| 4,997,129 A | 3/1991 | Waldrum |
| 5,134,961 A | 8/1992 | Giles et al. |
| 5,170,820 A | 12/1992 | Jones |
| 5,220,876 A | 6/1993 | Monson et al. |
| 5,260,875 A | 11/1993 | Tofte et al. |
| 5,334,987 A | 8/1994 | Teach |
| 5,348,226 A | 9/1994 | Heiniger et al. |
| 5,407,134 A | 4/1995 | Thompson et al. |
| 5,520,333 A | 5/1996 | David |
| 5,653,389 A | 8/1997 | Henderson et al. |
| 5,704,546 A | 1/1998 | Henderson et al. |
| 5,809,440 A | 9/1998 | Beck et al. |
| 5,911,362 A | 6/1999 | Wood et al. |
| 5,913,915 A | 6/1999 | Mcquinn |
| 5,934,561 A | 8/1999 | Knight |
| 5,950,921 A | 9/1999 | Cain et al. |
| 5,971,294 A | 10/1999 | Thompson et al. |
| 5,991,687 A | 11/1999 | Hale et al. |
| 5,995,902 A | 11/1999 | Monson |
| 6,062,496 A | 5/2000 | Kinter |
| 6,087,984 A | 7/2000 | Keller et al. |
| 6,122,581 A | 9/2000 | Mcquinn |
| 6,161,772 A | 12/2000 | Anfindsen |
| 6,189,807 B1 | 2/2001 | Miller et al. |
| 6,230,091 B1 | 5/2001 | Mcquinn |
| 6,285,938 B1 | 9/2001 | Lang et al. |
| 6,353,409 B1 | 3/2002 | Keller et al. |
| 6,463,374 B1 | 10/2002 | Keller et al. |
| 6,505,124 B2 | 1/2003 | Carr et al. |
| 6,510,367 B1 | 1/2003 | Mcquinn |
| 6,669,105 B2 | 12/2003 | Bryan et al. |
| 6,726,120 B2 | 4/2004 | Schaffter et al. |
| 6,776,355 B2 | 8/2004 | Ringer et al. |
| 6,813,544 B2 | 11/2004 | Seal et al. |
| 6,883,726 B2 | 4/2005 | Polk et al. |
| 6,926,211 B2 | 8/2005 | Bryan et al. |
| 7,103,451 B2 | 9/2006 | Seal et al. |
| 7,162,961 B2 | 1/2007 | Grimm et al. |
| 7,184,859 B2 | 2/2007 | Hood et al. |
| 7,213,772 B2 | 5/2007 | Bryan et al. |
| 7,278,294 B2 | 10/2007 | Giles et al. |
| 7,311,004 B2 | 12/2007 | Giles |
| 7,362,439 B2 | 4/2008 | Franzen et al. |
| 7,502,665 B2 | 3/2009 | Giles et al. |
| 7,665,348 B2 | 2/2010 | Giles |
| 7,706,926 B2 | 4/2010 | Peterson |
| 7,742,842 B2 | 6/2010 | Giles et al. |
| 7,826,930 B2 | 11/2010 | Giles et al. |
| 7,911,616 B2 | 3/2011 | Franzen et al. |
| 7,929,141 B2 | 4/2011 | Franzen et al. |
| 7,975,981 B2 | 7/2011 | Harrison, Jr. |
| 8,131,432 B2 | 3/2012 | Senneff et al. |
| 8,160,782 B2 | 4/2012 | Harrison, Jr. |
| 8,160,851 B2 | 4/2012 | Schick et al. |
| 8,170,849 B2 | 5/2012 | Schick et al. |
| 8,180,560 B2 | 5/2012 | Harrison, Jr. |
| 8,191,795 B2 | 6/2012 | Grimm et al. |
| 8,204,654 B2 | 6/2012 | Sachs et al. |
| 8,209,075 B2 | 6/2012 | Senneff et al. |
| 8,250,907 B2 | 8/2012 | Giles |
| 8,265,835 B2 | 9/2012 | Peterson et al. |
| 8,346,443 B2 | 1/2013 | Senneff et al. |
| 8,469,286 B2 | 6/2013 | Robinson, Jr. |
| 8,482,736 B2 | 7/2013 | Franzen et al. |
| 8,505,566 B2 | 8/2013 | Nguyen |
| 8,571,764 B2 | 10/2013 | Peterson et al. |
| 8,611,366 B2 | 12/2013 | Harrison, Jr. |
| 8,635,011 B2 | 1/2014 | Senneff et al. |
| 8,666,611 B2 | 3/2014 | Peterson et al. |
| 8,740,177 B2 | 6/2014 | Walker |
| 8,777,707 B2 | 7/2014 | Hoyle |
| 8,864,053 B2 | 10/2014 | Anderton et al. |
| 8,868,300 B2 | 10/2014 | Kocer et al. |
| 8,880,362 B2 | 11/2014 | Wilkens et al. |
| 8,924,030 B2 | 12/2014 | Wendte et al. |
| 8,965,643 B2 | 2/2015 | Peterson et al. |
| 9,046,895 B2 | 6/2015 | Orr et al. |
| 9,113,591 B2 | 8/2015 | Shivak |
| 9,127,241 B2 | 9/2015 | Hodge et al. |
| 9,339,023 B2 | 5/2016 | Ballu |
| 9,380,773 B2 | 7/2016 | Hebbert et al. |
| 9,445,540 B2 | 9/2016 | Ballu et al. |
| 9,504,212 B2 | 11/2016 | Michael et al. |
| 9,532,563 B2 | 1/2017 | Arenson et al. |
| 9,539,674 B2 | 1/2017 | Walker et al. |
| 9,580,256 B2 | 2/2017 | Wagers et al. |
| 9,661,809 B2 | 5/2017 | Chiocco et al. |
| 9,781,916 B2 | 10/2017 | Preheim et al. |
| 9,795,977 B2 | 10/2017 | Grimm et al. |
| 9,851,718 B2 | 12/2017 | Booher et al. |
| 9,939,417 B2 | 4/2018 | McPeek |
| 10,255,670 B1 | 4/2019 | Wu |
| 10,369,585 B2 | 8/2019 | Brooks et al. |
| 10,395,115 B2 | 8/2019 | Kumar et al. |
| 10,485,229 B2 | 11/2019 | Hammer et al. |
| 2002/0099471 A1 | 7/2002 | Benneweis |
| 2003/0111546 A1 | 6/2003 | Schaffter et al. |
| 2003/0132310 A1 | 7/2003 | Polk et al. |
| 2003/0187560 A1 | 10/2003 | Keller et al. |
| 2004/0217199 A1 | 11/2004 | Bryan et al. |
| 2005/0000277 A1 | 1/2005 | Giles |
| 2005/0024213 A1 | 2/2005 | Franzen et al. |
| 2005/0038568 A1 | 2/2005 | Hood et al. |
| 2006/0151680 A1 | 7/2006 | Franzen et al. |
| 2006/0225489 A1 | 10/2006 | Giles et al. |
| 2006/0273189 A1 | 12/2006 | Grimm et al. |
| 2008/0114497 A1 | 5/2008 | Giles et al. |
| 2008/0114498 A1 | 5/2008 | Giles et al. |
| 2008/0230624 A1 | 9/2008 | Giles et al. |
| 2008/0251600 A1 | 10/2008 | Sorensen et al. |
| 2008/0307893 A1 | 12/2008 | Giles |
| 2008/0316491 A1 | 12/2008 | Franzen et al. |
| 2009/0037041 A1 | 2/2009 | Senneff et al. |
| 2009/0037096 A1 | 2/2009 | Senneff et al. |
| 2009/0050704 A1 | 2/2009 | Harrison, Jr. |
| 2009/0050705 A1 | 2/2009 | Harrison, Jr. |
| 2009/0050831 A1 | 2/2009 | Harrison, Jr. |
| 2009/0054997 A1 | 2/2009 | Harrison, Jr. |
| 2009/0112372 A1 | 4/2009 | Peterson |
| 2009/0132132 A1 | 5/2009 | Peterson et al. |
| 2009/0192654 A1 | 7/2009 | Wendte et al. |
| 2009/0216406 A1 | 8/2009 | Senneff et al. |
| 2009/0240430 A1 | 9/2009 | Sachs et al. |
| 2010/0121616 A1 | 5/2010 | Schick et al. |
| 2010/0121620 A1 | 5/2010 | Schick et al. |
| 2010/0132439 A1 | 6/2010 | Giles |

(56) References Cited

U.S. PATENT DOCUMENTS

| | | |
|---|---|---|
| 2011/0015832 A1 | 1/2011 | Hoyle |
| 2011/0054743 A1 | 3/2011 | Kocer et al. |
| 2011/0077784 A1 | 3/2011 | Lips |
| 2011/0139899 A1 | 6/2011 | Robinson, Jr. |
| 2011/0235043 A1 | 9/2011 | Franzen et al. |
| 2011/0248104 A1 | 10/2011 | Malsam |
| 2013/0037625 A1 | 2/2013 | Arenson |
| 2013/0153676 A1 | 6/2013 | Ballu et al. |
| 2013/0292487 A1 | 11/2013 | Ballu |
| 2014/0070019 A1 | 3/2014 | Chiocco et al. |
| 2014/0263709 A1 | 9/2014 | Kocer et al. |
| 2014/0277780 A1 | 9/2014 | Jensen et al. |
| 2014/0277781 A1 | 9/2014 | Mangen et al. |
| 2015/0027043 A1 | 1/2015 | Redden et al. |
| 2017/0086363 A1* | 3/2017 | Tribelhorn ............ A01C 23/007 |
| 2017/0106386 A1 | 4/2017 | Milo et al. |
| 2017/0120263 A1 | 5/2017 | Needham et al. |
| 2017/0274400 A1 | 9/2017 | Kowalchuk |
| 2018/0139895 A1 | 5/2018 | Brechon |
| 2019/0098888 A1 | 4/2019 | Murphy et al. |
| 2019/0124827 A1 | 5/2019 | Davis et al. |
| 2019/0246557 A1 | 8/2019 | Booher |
| 2019/0257678 A1 | 8/2019 | Posselius et al. |
| 2019/0321844 A1 | 10/2019 | Schrader et al. |
| 2019/0357520 A1 | 11/2019 | Redden et al. |
| 2020/0156100 A1 | 5/2020 | Booher |

OTHER PUBLICATIONS

USPTO, International Search Report, PCT/US2021/01500, dated Apr. 9, 2021.

Shen, Yue & Zhu, Heping & Liu, Hui & Chen, Yu & Ozkan, Erdal. (2017). Development of a Laser-Guided, Embedded-Computer-Controlled, Air-Asissted Precision Sprayer. Transactions of the ASABE. 60. 1827-1838. 10.13031/trans.12455.

* cited by examiner

SPRAYING SYSTEMS, KITS, VEHICLES, AND METHODS OF USE

CROSS-REFERENCE TO RELATED APPLICATIONS

The present application claims priority to, incorporates herein by reference, and is a continuation-in-part of, U.S. patent application Ser. No. 16/274,833 filed Feb. 13, 2019 by inventors Steven R. Booher, Gary A. Vandenbark, and Mike Hilligoss, and entitled Kits, Systems, and Methods for Sprayers, which published as US-2019-0246557-A1 on Aug. 15, 2019 (herein "the '833 Application"). The present application also claims priority to and incorporates herein by reference, U.S. provisional patent application Ser. No. 62/630,139 filed Feb. 13, 2018 by inventors Steven R. Booher, Gary A. Vandenbark, and Mike Hilligoss, and entitled Kits, Systems, and Methods for Sprayers (herein "the '139 Application"), and U.S. provisional patent application Ser. No. 62/713,457 filed Aug. 1, 2018 by inventor Gary A. Vandenbark and entitled Sprayer Systems, Kits, and Methods of Use (herein "the '457 Application").

FEDERALLY SPONSORED RESEARCH OR DEVELOPMENT

None.

TECHNICAL FIELD

The present disclosure relates generally to spraying, and in particular to agricultural spraying with vehicle-mounted spraying equipment, as well as kits, systems, and methods regarding same. Such spraying includes, for example but not by way of limitation, horticulture and ground maintenance spraying.

BACKGROUND

Sprayer vehicles, or vehicles with spraying equipment mounted to them, are known and the details of their typical components and functions are not repeated here, except where incorporated by reference.

U.S. Pat. No. 5,334,987 to Teach ("Teach"), incorporated herein by reference, discusses an aircraft control system for applying chemicals to an agricultural field in connection with certain predetermined flight patterns. A global positioning system receiver receives radio frequency signals from satellites and the position of the aircraft is determined from the information contained in the received signals. An aircraft computer stores the surface coordinates of the field to be sprayed. The aircraft pilot enters into the computer the desired orientation, swath width and track width of the flight pattern. The computer then produces a flight pattern having the desired orientation, and during flight generates audible signals representative of amount and direction of deviation from the desired flight pattern. The computer also automatically activates and deactivates chemical spraying upon entering and exiting, respectfully, the airspace above the field. The system discussed in Teach involves hardware and software specific to aviation and integrated into an airplane, and, among other drawbacks, does not turn individual sprayer nozzles on and off independently, nor does it turn off any of its sprayer mechanism when the pilot overlaps previously-sprayed areas.

U.S. Pat. No. 5,704,546 to Henderson, et al. ("Henderson"), incorporated herein by reference, discusses a complex integrated position-responsive control system and method for a sprayer, purporting to provide droplet size control, drift reduction, spray transport modeling and gradients of application rates to avoid drift (e.g., Col. 3, lines 35-39). The position-responsive control system monitors the position of a spray vehicle, and changes the spray system operating conditions in response to the sprayer vehicle position. The control system includes a setpoint conversion subroutine for independently controlling the flow rate and volume median droplet size setpoints. The control system also includes performance envelopes for various nozzle tips. An independent flow rate and droplet size control method is provided for use with the control system. A position-responsive control system receives information pertaining to the boundaries of spray zones and spray conditions, such as application rates and volume median droplet diameters associated with the spray zones. Henderson's system is complex and would be expensive to implement, especially on existing sprayer vehicles that do not already include the specialized equipment required by Henderson.

U.S. Pat. No. 9,939,417 B2 to McPeek ("McPeek"), incorporated herein by reference, discusses systems and methods for monitoring fruit production, plant growth, and plant vitality. McPeek discusses a system for detecting and geo-referencing objects, such as trees or other plants, using a combination of three-dimensional laser scanning (LiDAR), global positioning systems (GPS), and wide-angle high-definition video and/or thermal video, and communicating, recording, classifying, and processing the resulting data to determine tree trunk diameter, height of trees, volume of trees, leaf density of trees, color of leaves on trees, GPS location of trees, and other data. McPeek suggests the possibility of using the analyzed data to guide fruit tree sprayers (e.g., to determine when to spray, how long to spray, and what chemicals to spray). McPeek's system includes the arduous step of applying a unique radio frequency identification tag (RFID tag) individually to each tree, and then pairing the data with the respective RFID tags.

U.S. Pat. No. 10,395,115 B2 to Kumar et al. ("Kumar"), incorporated herein by reference, discusses LiDAR and thermal imaging systems and deployment modalities for close-range sensing of critical properties (such as canopy volume, leaf area, water stress, and crop yield) of specialty crops, such as apples, oranges, strawberries, peaches, and pecans, for purposes of yield estimation and disease monitoring, and to enable more precise fertilization, spraying, and pruning.

Shen, Yue & Zhu, Heping & Liu, Hui & Chen, Yu & Ozkan, Erdal. (2017). Development of a Laser-Guided, Embedded-Computer-Controlled, Air-Assisted Precision Sprayer. Transactions of the ASABE. 60. 1827-1838. 10.13031/trans.12455. (available online at https://doi.org/10.13031/trans.12455) ("Shen et al."), a copy of which was submitted with the present application in an Information Disclosure Statement, discussed an air-assisted precision sprayer system with an embedded computer and other built-in hardware that used LiDAR and a travel speed sensor to sense and calculate in real-time whether an object, such as a portion of a tree canopy, would be within a pre-defined distance from a spray nozzle, and to turn on the nozzle and spray the object if the object was sensed and calculated in real time to be within the pre-defined distance from the spray nozzle, and to turn off the nozzle and not spray if no object was determined in real time to be within the pre-defined distance from the spray nozzle. Flow rate could be adjusted, for instance based on foliage density. However, the Shen et al. system, like the McPeek system if it was without its RFID tags on the trees, was "dumb" in that it did not know geographically where it was, or what orientation it was in, when it was spraying. Thus the data gained from each pass of the Shen et al. system was disembodied from the locations and orientations where the spraying actually took place, and as a consequence the Shen et al. data could not be used to accurately reproduce the same spraying of the same objects in the future, nor could it be used to directly compare trends in repeatedly spraying the same objects over time.

A need remains for a "smart" sprayer control system with advanced features that is inexpensive and easy to implement with few component changes, including as kits readily adaptable to numerous existing sprayer vehicles.

SUMMARY

The present invention elegantly overcomes various drawbacks and limitations of past systems and provides numerous additional benefits as will be apparent to persons of skill in the art. For example, provided in various example embodiments is a kit configured to be added-on to a vehicle having a source of electrical power and an air-assisted agricultural spraying system comprising a tank for holding a liquid to be sprayed and a plurality of spaced-apart nozzle assemblies in liquid communication with the tank, each nozzle assembly comprising a check valve removably installed in a port in each respective nozzle assembly. In various example embodiments the kit may comprise: a plurality of pulse-width-modulated solenoids configured to be installed in the ports upon removal of the check valves and to selectably turn on and off and vary flow rate of the liquid through the nozzle assemblies when the plurality of pulse-width-modulated solenoids are installed in the ports; one or more controllers configured to be in electrical communication with the plurality of pulse-width-modulated solenoids and to electrically actuate the solenoids to selectably turn on and off and vary flow rate of the liquid through the nozzle assemblies when the plurality of pulse-width-modulated solenoids are installed in the ports; first bracketry configured to attach the one or more controllers with the vehicle; a first wiring harness configured to be attached to the vehicle and to electrically connect the one or more controllers with the plurality of pulse-width-modulated solenoids; a second wiring harness configured to be attached to the vehicle and to electrically connect the one or more controllers with the source of electrical power; a GPS antenna system; second bracketry configured to attach the GPS antenna system with the vehicle; a third wiring harness configured to be attached to the vehicle and to electrically connect the GPS antenna system with the source of electrical power; a LiDAR sensing system; third bracketry configured to attach the LiDAR sensing system with the vehicle; a fourth wiring harness configured to be attached to the vehicle and to electrically connect the LiDAR sensing system with the source of electrical power; and a mobile device configured to be in wireless communication with the GPS antenna system and the one or more controllers, and to be in data communication with the LiDAR sensing system. In various example embodiments the mobile device may be further configured to receive one or more inputs from a user defining user-selectable criteria for spraying, and to receive geographic location and velocity information from the GPS antenna system, and to process the geographic location and velocity information in view of one or more databases of information comprising map data defining spray regions and no-spray regions, and plant data corresponding to one or more of locations, heights, widths, shapes, and densities of plants located within the spray regions, and vehicle data defining the locations of each of the nozzle assemblies relative to the locations of the GPS antenna system and the LiDAR sensing system when installed on the vehicle, and based thereon wirelessly communicate on, off, and pulse-width modulating signals to the one or more controllers to individually turn on and off flow of the liquid through each of the individual nozzle assemblies based on whether each nozzle assembly is within a spray region or a no-spray region, and to turn on or off or vary flow rate of the liquid through each of the nozzle assemblies based on the user-selectable criteria, velocity information, and plant data corresponding to a portion of a plant proximate each nozzle assembly when installed on the vehicle.

In various example embodiments the LiDAR sensing system may comprise a WiFi router configured to be in wireless communication with the mobile device. In various example embodiments of the kit the LiDAR sensing system may comprise a fan configured to blow debris away from at least a sensing portion of the LiDAR sensing system.

In various example embodiments the user-selectable criteria for spraying may comprise a vertical boundary where the controller is configured to turn off liquid flow through nozzle assemblies oriented to direct spray beyond the vertical boundary when installed on the vehicle. In various example embodiments the vertical boundary may be selectable to be a function of the plant data corresponding to height of a plant. In various example embodiments user-selectable criteria for spraying may comprise one or more adjustments to the flow rate of the liquid through the nozzle assemblies as a function of the plant data corresponding to density of a plant. In various example embodiments user-selectable criteria for spraying may comprise one or more adjustments to the flow rate of the liquid through the nozzle assemblies as a function of changes in plant data for a given plant over time.

In various example embodiments the kit may further comprise fourth bracketry configured to attach the mobile device with the vehicle near a driver's location on the vehicle. In various example embodiments the kit may further comprise a fifth wiring harness configured to be attached to the vehicle and to electrically connect the mobile device with the source of electrical power when the mobile device is attached with the vehicle near the driver's location on the vehicle.

Also provided in various example embodiments is a method of installing a kit as described herein on a vehicle as described herein, the method comprising the steps of: providing such a vehicle and a kit as described herein; removing the check valves from the ports in the nozzle assemblies; installing the plurality of pulse-width-modulated solenoids in the ports; attaching with the first bracketry the one or more controllers with the vehicle; connecting with the first wiring harness the one or more controllers with the plurality of pulse-width-modulated solenoids; attaching the first wiring harness to the vehicle; connecting with the second wiring harness the one or more controllers with the source of electrical power; attaching the second wiring harness to the vehicle; attaching with the second bracketry the GPS antenna system with the vehicle; connecting with the third wiring harness the GPS antenna system with the source of electrical power; attaching the third wiring harness to the vehicle; attaching with the third bracketry the LiDAR sensing system with the vehicle; connecting with the fourth wiring harness the LiDAR sensing system with the source of electrical power; attaching the fourth wiring harness to the vehicle; and entering vehicle data into the one or more databases defining the locations of each of the nozzle assemblies relative to the locations of the GPS antenna system and the LiDAR sensing system when installed on the vehicle.

In various example embodiments the method may further comprise the steps of entering map data into the one or more databases defining spray regions and no-spray regions. In various example embodiments the step of entering map data into the one or more databases defining spray regions and no-spray regions may comprise the steps of driving the vehicle along one or more edges of one or more spray regions or no-spray regions and recording travel path data transmitted from the GPS antenna system to the mobile device. In various example embodiments the step of entering map data into the one or more databases defining spray regions and no-spray regions may comprise the steps of directing a different vehicle, having a second GPS antenna system, along one or more edges of one or more spray regions or no-spray regions and recording travel path data transmitted from the second GPS antenna system to the mobile device.

In various example embodiments the step of entering map data into the one or more databases defining spray regions and no-spray regions may comprises the steps of delineating one or more edges of one or more spray regions or no-spray regions on a GUI overlay of a digital image of a map. In various example embodiments the step of entering map data into the one or more databases defining spray regions and no-spray regions may comprise the steps of downloading at least a portion of the map data wirelessly from the cloud to the mobile device.

In various example embodiments the method may further comprise the steps of: inputting into the mobile device user-selectable criteria for spraying; and entering plant data into the one or more databases corresponding to one or more of locations, heights, widths, shapes, and densities of plants located within the spray regions. In various example embodiments the step of entering plant data into the one or more databases corresponding to one or more of locations, heights, widths, shapes, and densities of plants located within the spray regions may comprise the steps of driving the vehicle proximate plants within one of the spray regions and recording travel path data transmitted from the GPS antenna system to the mobile device while also recording plant data transmitted from the LiDAR sensing system to the mobile device. In various example embodiments the step of entering plant data into the one or more databases corresponding to one or more of locations, heights, widths, shapes, and densities of plants located within the spray regions may comprise the steps of directing a different vehicle, having a second GPS antenna system and a second LiDAR sensing system, proximate plants within one of the spray regions and recording travel path data transmitted from the second GPS antenna system to the mobile device while also recording plant data transmitted from the second LiDAR sensing system to the mobile device. In various example embodiments the step of entering plant data into the one or more databases corresponding to one or more of locations, heights, widths, shapes, and densities of plants located within the spray regions may comprise the steps of delineating plant data within a spray region on a GUI overlay of a digital image of a map. In various example embodiments the step of entering plant data into the one or more databases corresponding to one or more of locations, heights, widths, shapes, and densities of plants located within the spray regions may comprise the steps of downloading at least a portion of the plant data wirelessly from the cloud to the mobile device.

In various example embodiments the step of inputting into the mobile device user-selectable criteria for spraying may comprise the steps of selecting a vertical boundary so that the controller is configured to turn off liquid flow through nozzle assemblies oriented to direct spray beyond the vertical boundary. In various example embodiments the vertical boundary may be selected to be a function of the plant data corresponding to height of a plant.

In various example embodiments the step of inputting into the mobile device user-selectable criteria for spraying may comprise the steps of selecting one or more adjustments to the flow rate of the liquid through the nozzle assemblies as a function of the plant data corresponding to density of a plant. In various example embodiments the step of inputting into the mobile device user-selectable criteria for spraying may comprise the steps of selecting one or more adjustments to the flow rate of the liquid through the nozzle assemblies as a function of changes in plant data for a given plant over time.

Further provided in various example embodiments is a vehicle having a source of electrical power and an air-assisted agricultural spraying system comprising: a tank for holding a liquid to be sprayed; a plurality of spaced-apart nozzle assemblies in liquid communication with the tank, each nozzle assembly comprising a pulse-width-modulated solenoid configured to selectably turn on and off and vary flow rate of the liquid through the nozzle assembly; one or more controllers in electrical communication with the plurality of pulse-width-modulated solenoids and configured to electrically actuate the solenoids to selectably turn on and off and vary flow rate of the liquid through the nozzle assemblies; first bracketry attaching the one or more controllers with the vehicle; a first wiring harness attached to the vehicle and electrically connecting the one or more controllers with the plurality of pulse-width-modulated solenoids; a second wiring harness attached to the vehicle and electrically connecting the one or more controllers with the source of electrical power; a GPS antenna system; second bracketry attaching the GPS antenna system with the vehicle; a third wiring harness attached to the vehicle and electrically connecting the GPS antenna system with the source of electrical power; a LiDAR sensing system; third bracketry attaching the LiDAR sensing system with the vehicle; a fourth wiring harness attached to the vehicle and electrically connecting the LiDAR sensing system with the source of electrical power; and a mobile device configured to be in wireless communication with the GPS antenna system and the one or more controllers, and to be in data communication with the LiDAR sensing system. In various example embodiments the mobile device may be further configured to receive one or more inputs from a user defining user-selectable criteria for spraying, and to receive geographic location and velocity information from the GPS antenna system, and to process the geographic location and velocity information in view of one or more databases of information comprising map data defining spray regions and no-spray regions, and plant data corresponding to one or more of locations, heights, widths, shapes, and densities of plants located within the spray regions, and vehicle data defining the locations of each of the nozzle assemblies relative to the locations of the GPS antenna system and the LiDAR sensing system when installed on the vehicle, and based thereon wirelessly communicate on, off, and pulse-width modulating signals to the one or more controllers to individually turn on and off flow of the liquid through each of the individual nozzle assemblies based on whether each nozzle assembly is within a spray region or a no-spray region, and to turn on or off or vary flow rate of the liquid through each of the nozzle assemblies based on the user-selectable criteria, velocity information, and plant data corresponding to a portion of a plant proximate each nozzle assembly when installed on the vehicle.

In various example embodiments the mobile device may be configured to update the plant data in real-time during use of the vehicle to update one or more of locations, heights, widths, shapes, and densities of plants located within the spray regions as the spray regions are sprayed by the vehicle.

In various example embodiments the vehicle may comprise fourth bracketry attaching the mobile device with the vehicle near a driver's location on the vehicle, and a fifth wiring harness attached to the vehicle and electrically connecting the mobile device with the source of electrical power. In various example embodiments of the vehicle the LiDAR sensing system may comprise a WiFi router configured to be in wireless communication with the mobile device. In various example embodiments of the vehicle the LiDAR sensing system may comprise a fan configured to blow debris away from at least a sensing portion of the LiDAR sensing system.

Additionally provided in various example embodiments is a kit configured to be added-on to a vehicle having a source of electrical power and an air-assisted agricultural spraying system comprising a tank for holding a liquid to be sprayed and a plurality of spaced-apart nozzle assemblies in liquid communication with the tank, the kit comprising: a plurality of pulse-width-modulated solenoids configured to be installed in fluid communication with the nozzle assemblies and to selectably turn on and off and vary flow rate of the liquid through the nozzle assemblies when the plurality of pulse-width-modulated solenoids are installed in fluid communication with the nozzle assemblies; one or more controllers configured to be in electrical communication with the plurality of pulse-width-modulated solenoids and to electrically actuate the solenoids to selectably turn on and off and vary flow rate of the liquid through the nozzle assemblies when the plurality of pulse-width-modulated solenoids are installed in the ports; first bracketry configured to attach the one or more controllers with the vehicle; a first wiring harness configured to be attached to the vehicle and to electrically connect the one or more controllers with the plurality of pulse-width-modulated solenoids; a second wiring harness configured to be attached to the vehicle and to electrically connect the one or more controllers with the source of electrical power; a GPS antenna system; second bracketry configured to attach the GPS antenna system with the vehicle; a third wiring harness configured to be attached to the vehicle and to electrically connect the GPS antenna system with the source of electrical power; a LiDAR sensing system; third bracketry configured to attach the LiDAR sensing system with the vehicle; a fourth wiring harness configured to be attached to the vehicle and to electrically connect the LiDAR sensing system with the source of electrical power; and a mobile device configured to be in wireless communication with the GPS antenna system and the one or more controllers, and to be in data communication with the LiDAR sensing system. In various example embodiments the mobile device may be further configured to receive one or more inputs from a user defining user-selectable criteria for spraying, and to receive geographic location and velocity information from the GPS antenna system, and to process the geographic location and velocity information in view of one or more databases of information comprising map data defining spray regions and no-spray regions, and plant data corresponding to one or more of locations, heights, widths, shapes, and densities of plants located within the spray regions, and vehicle data defining the locations of each of the nozzle assemblies relative to the locations of the GPS antenna system and the LiDAR sensing system when installed on the vehicle, and based thereon wirelessly communicate on, off, and pulse-width modulating signals to the one or more controllers to individually turn on and off flow of the liquid through each of the individual nozzle assemblies based on whether each nozzle assembly is within a spray region or a no-spray region, and to turn on or off or vary flow rate of the liquid through each of the nozzle assemblies based on the user-selectable criteria, velocity information, and plant data corresponding to a portion of a plant proximate each nozzle assembly when installed on the vehicle.

Also provided is a method of installing a kit as described herein on a vehicle as described herein, the method comprising the steps of: providing such a vehicle and a kit as described herein; installing the plurality of pulse-width-modulated solenoids in fluid communication with the nozzle assemblies; attaching with the first bracketry the one or more controllers with the vehicle; connecting with the first wiring harness the one or more controllers with the plurality of pulse-width-modulated solenoids; attaching the first wiring harness to the vehicle; connecting with the second wiring harness the one or more controllers with the source of electrical power; attaching the second wiring harness to the vehicle; attaching with the second bracketry the GPS antenna system with the vehicle; connecting with the third wiring harness the GPS antenna system with the source of electrical power; attaching the third wiring harness to the vehicle; attaching with the third bracketry the LiDAR sensing system with the vehicle; connecting with the fourth wiring harness the LiDAR sensing system with the source of electrical power; attaching the fourth wiring harness to the vehicle; and entering vehicle data into the one or more databases defining the locations of each of the nozzle assemblies relative to the locations of the GPS antenna system and the LiDAR sensing system when installed on the vehicle.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

Examples of the invention can be better understood with reference to the following figures. The components within the figures are not necessarily to scale, emphasis instead being placed on clearly illustrating example aspects of the invention. In the figures, like reference numerals designate corresponding parts throughout the different views, which reference numerals might or might not correspond to corresponding or analogous parts in the '833 Application. It will be understood that certain components and details may not appear in the figures to assist in more clearly describing the invention.

FIG. 1A is a top plan view of an example vehicle for use with various example embodiments of the invention, shown with its sprayers on.

Figure 1A:
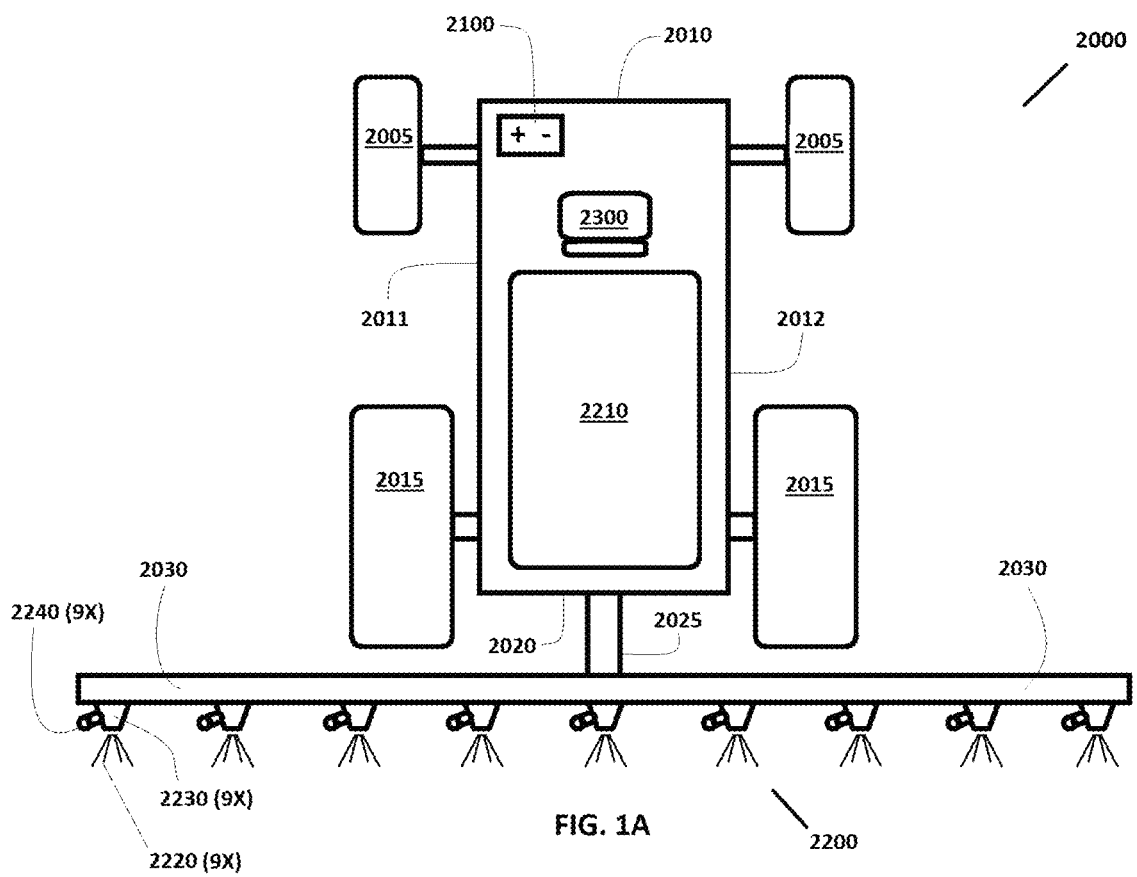

Additionally, the figures, drawings, and photographs in the '139 Application, which is incorporated herein by reference for all that it teaches, including its own incorporations by reference, illustrate certain aspects of example embodiments of the invention, wherein: page 14 is a diagram illustrating various example components of an example embodiment; pages 000015 and 000016 provide example details of certain components according to a first example embodiment; pages 000017 and 000018 provide example details of certain components according to a second example embodiment; pages 000019 to 000031 provide information regarding an example installation of certain example components according to an example embodiment; pages 000032 to 000098 provide example views and information regarding one or more screen interfaces as viewable by a user of an example system; pages 000099 to 000147 provide example views and information regarding an example web portal for use in connection with example system embodiments; and pages 000148 to 000182 provide example information regarding software that may be used in connection with example embodiments.

The invention is not limited to what is shown in these example figures. The invention is broader than the examples shown in the figures and covers anything that falls within any of the claims.

DETAILED DESCRIPTION OF EXAMPLE EMBODIMENTS

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 1B:
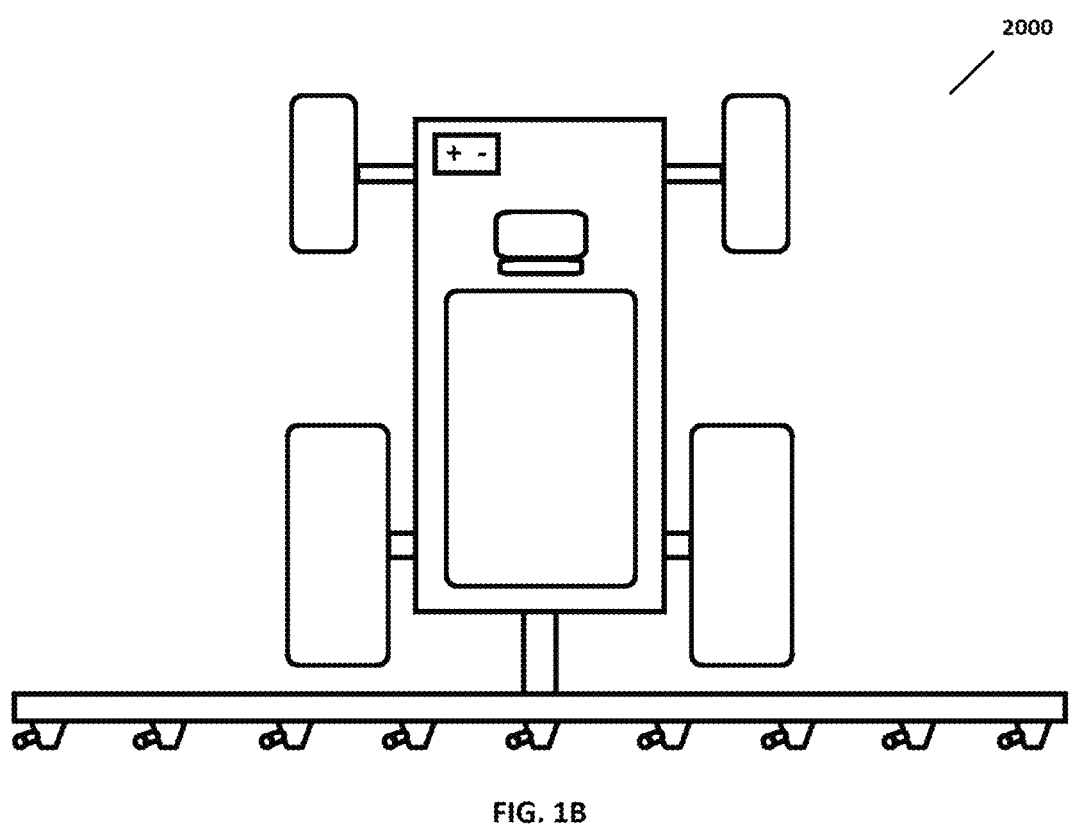
FIG. 1B is a top plan view of the example vehicle of FIG. 1A, shown with its sprayers off.

Turning first to FIGS. 1A and 1B, depicted is a top plan view of one example embodiment of a conventional vehicle 2000, shown with the sprayers on (FIG. 1A) and off (FIG. 1B). It is understood that the nature, size, type, layout, orientation, number of wheels or tracks and other details regarding the vehicle 2000, are generally unimportant to the invention except where recited in the claims. Accordingly, a single generic example vehicle 2000 is used consistently throughout the figures as a backdrop to illustrate possible implementations of the invention, and the details of this example vehicle 2000 should in no way be used to limit the scope of the invention, except where specifically recited in the claims. For example, vehicle 2000 includes nine (9) nozzle assemblies 2230; this is entirely arbitrary and is not limiting, as any suitable number of nozzle assemblies 2230 could be used.

With continuing reference to FIGS. 1A and 1B, this particular example vehicle 2000 is shown having a front end 2010, a back end 2020, a left side 2011, and a right side, 2012, a source of electrical power 2100 (such as a battery, charging system, and the wiring system connected therewith, any of which may be located anywhere on the vehicle), a driver's location 2300 (which may include a seat as shown), and comprising front steerable wheels 2005 near the front end 2010 and rear driven wheels 2015 near the rear end 2020. It is understood that while the wheels 2005 and 2015 appear generally rectangular from this top view, they would appear round in a left side or side view (not shown). This example sprayer 2000 is an air-delivery or air-blast sprayer and includes a spraying system 2200 comprising a tank 2210 (which while appearing generally rectangular from a top view, might appear round in a front or rear view, not shown) for holding a liquid 2220 (in the form of a fog or mist) (such as water containing chemicals such as fertilizers and the like) to be sprayed with the assistance of fan-driven air pressure by the vehicle 2000 (the vehicle 2000 may comprise a tractor or other vehicle with a sprayer attachment secured thereto). The spraying system 2200 also includes a laterally-elongated nozzle-positioning structure 2030 attached to the back end 2020 of the example vehicle 2000 with a mounting structure 2025, the nozzle-positioning structure 2030 extending laterally beyond the left side 2011 and past the right side 2012. Affixed to the nozzle-positioning structure 2030 are a plurality (nine (9), in this case) of spaced-apart nozzle assemblies 2230 in liquid communication with the tank 2210 and in pressurized air communication with one or more fans (not shown). FIG. 1A depicts the nozzle assemblies 2230 spraying the liquid 2220 (in the form of a fog or mist) toward the ground, for instance when the liquid 2220 (in the form of a fog or mist) is being pumped through the nozzle assemblies 2230 from the tank 2210 by a pump (not shown) with air pressure assistance (not shown). In contrast, FIG. 1B depicts the same nozzle assemblies 2230 not spraying the liquid 2220 (in the form of a fog or mist) toward the ground, for instance when the liquid 2220 (in the form of a fog or mist) is not being pumped through the nozzle assemblies 2230 from the tank 2210 by a pump (not shown). In this type of embodiment a check valve 2240 may be removably installed in each nozzle assembly, for instance to close off the nozzle assembly 2230 and prevent back-flow into the spraying system 2200 when the liquid 2220 (in the form of a fog or mist) is not being forced through the nozzle assembly 2230.

Figure 2:
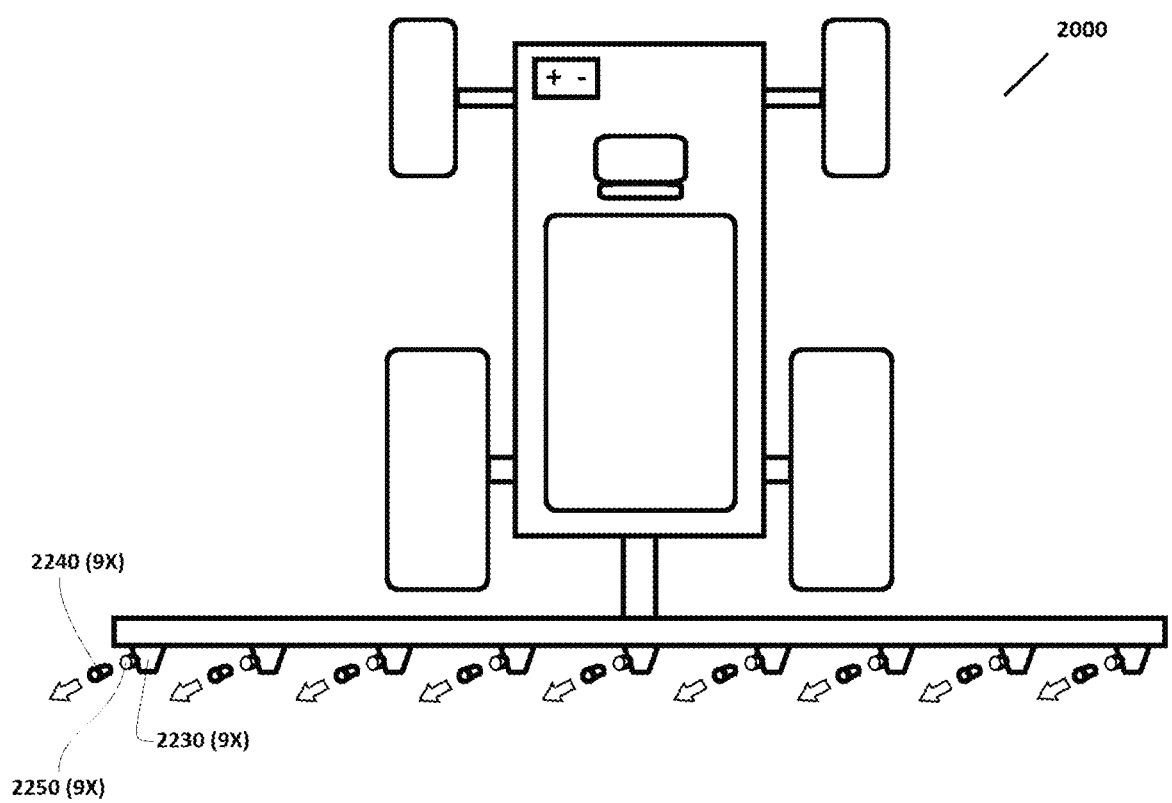
FIG. 2 is a top plan view of the example vehicle of FIG. 1A, illustrating removal of check valves from ports in the nozzle assemblies, in accordance with certain example embodiments.

FIG. 2 illustrates the removal of the check valves 2240 from the ports 2250 in each respective nozzle assembly 2230. Each port 2250 provides access to the flow channel for the liquid 2220 (in the form of a fog or mist) when the liquid 2220 (in the form of a fog or mist) flows through the nozzle assembly 2230. The vehicle 2000 is now ready for the installation of a kit 1000.

Alternatively, separate ports (not shown) adapted to receive the present pulse-width-modulated solenoids 1010 can be plumbed into liquid communication with the nozzle assemblies 2230, for instance with a T-fitting, and the separate ports may also or alternatively be referred to as ports 2250 for purposes of the present disclosure. Such T-fittings or other components necessary to accomplish such plumbing changes may be provided as part of the kit 1000 in various example embodiments.

Figure 3:
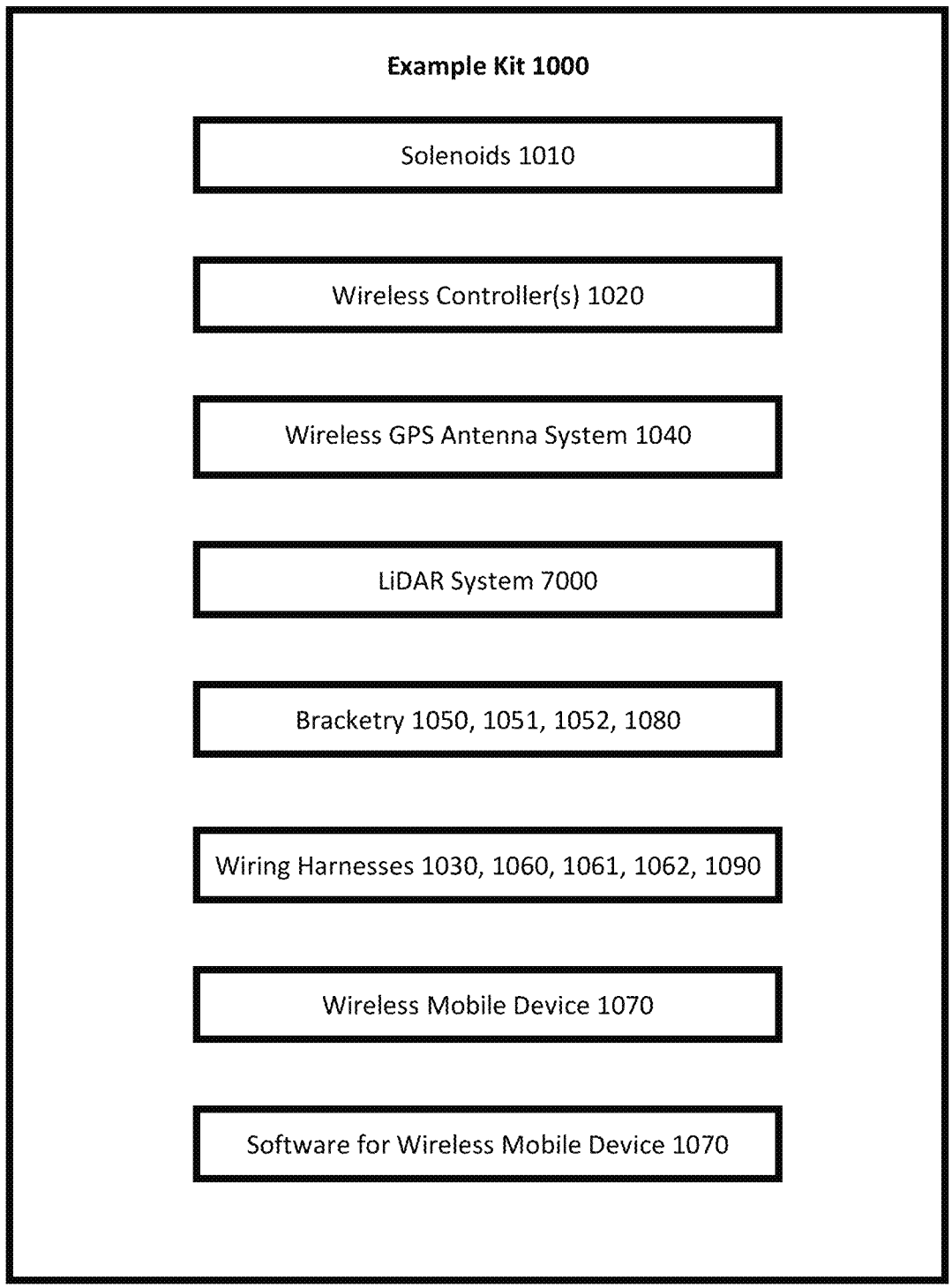
FIG. 3 is a diagram listing example contents of an example kit for vehicles such as the one shown in FIG. 2, according to various example embodiments, with the understanding that a kit according to the present invention may include fewer and/or additional contents.

FIG. 3 illustrates potential contents of an example kit 1000 according to various example embodiments. Such a kit 1000 need not be sold together in a single package to constitute the kit 1000. Rather, the present kits 1000 are constituted any time the individual contents of the kit 1000 are brought together in any way for manufacture, use, sale, or importation. Various aspects of the components identified in FIG. 3 are further described herein, as well as additional and alternative components of kits 1000. Additional details regarding example components of kits 1000 are provided in the '139 Application, which is incorporated herein by reference.

Figure 4:
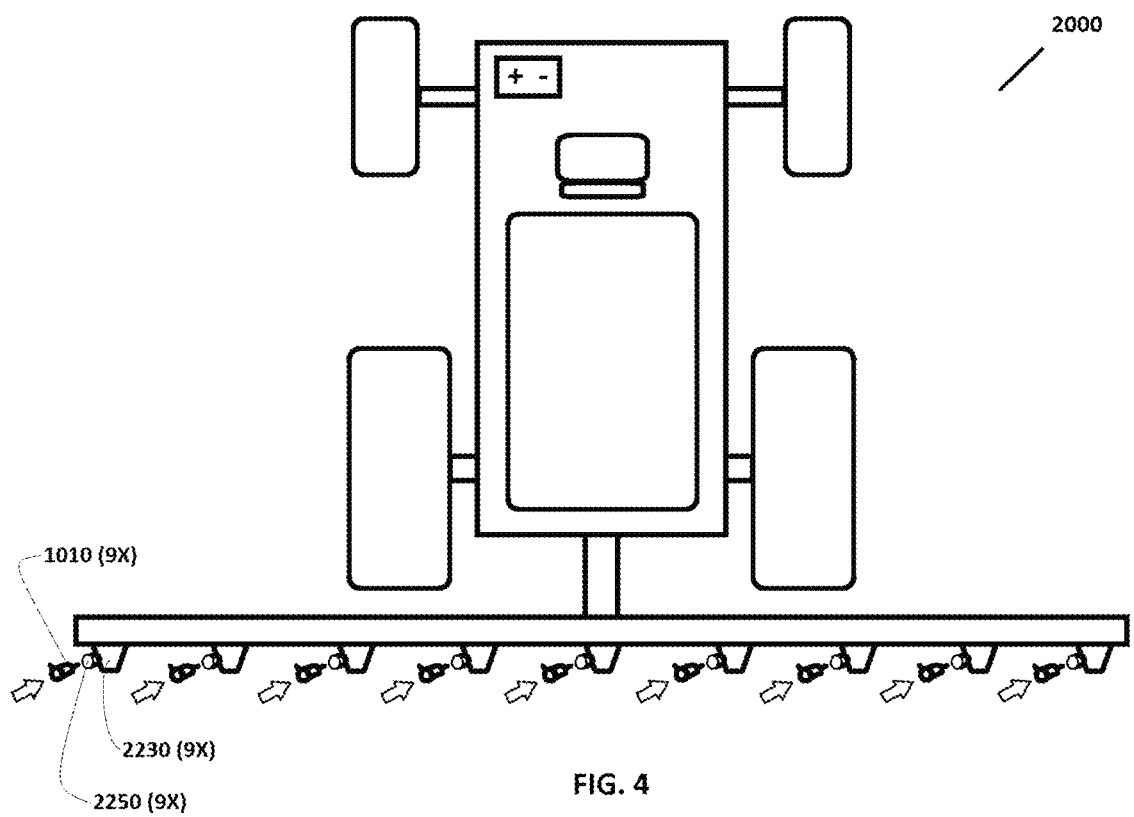
FIG. 4 is a top plan view of the example vehicle of FIG. 2, illustrating installation of pulse-width-modulated solenoids into the fluid communication with the nozzle assemblies, which may include installing the solenoids into the ports of the nozzle assemblies from which the check valves were removed in certain example embodiments.
Figure 5:
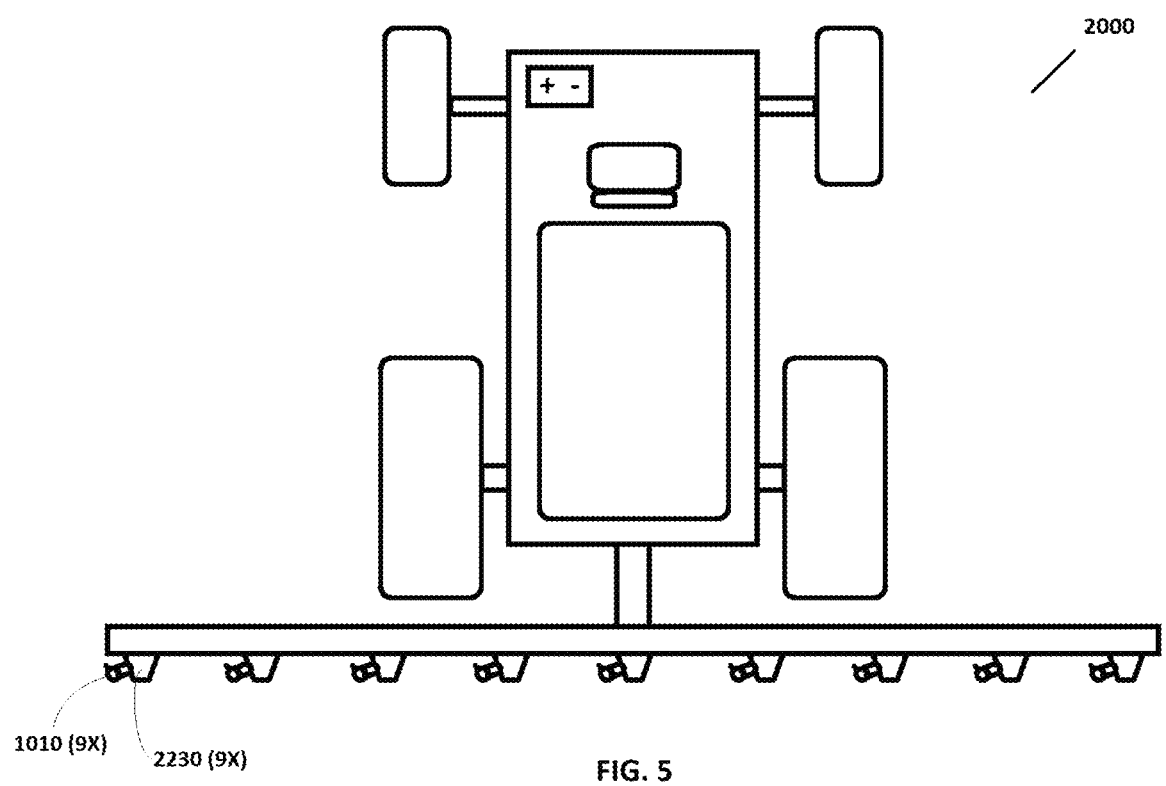
FIG. 5 is a top plan view of the example vehicle of FIG. 4, illustrating the pulse-width-modulated solenoids having been installed in fluid communication with the nozzle assemblies, which may have included installing the solenoids into the ports of the nozzle assemblies from which the check valves were removed in certain example embodiments.
Figure 6A:
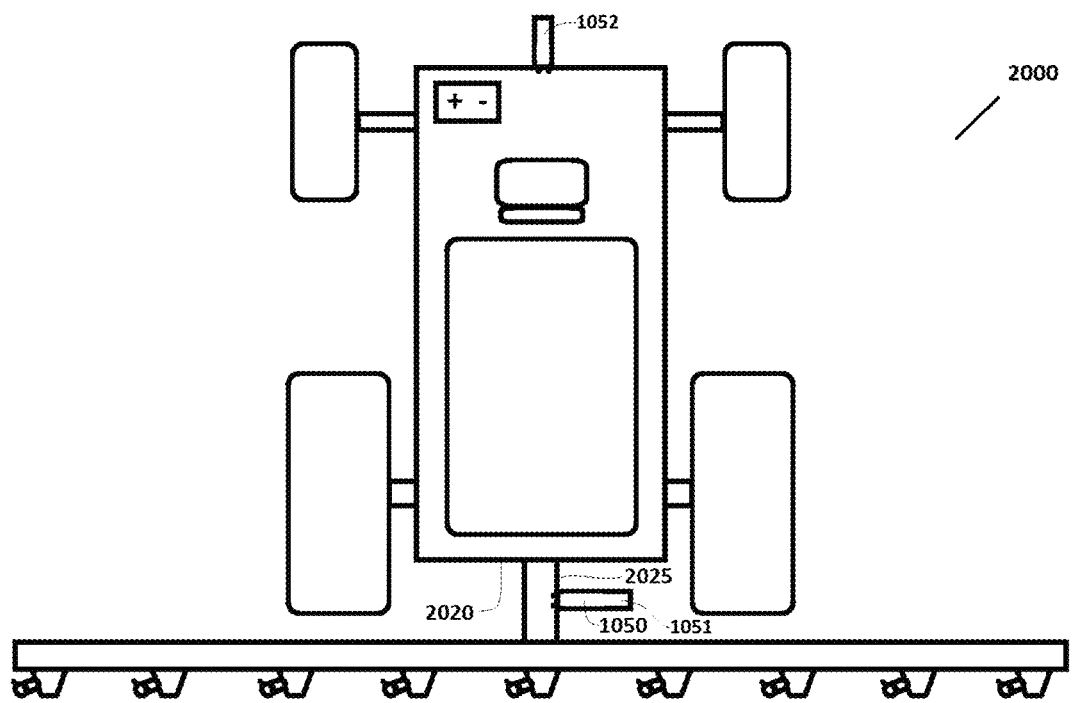
FIG. 6A is a top plan view of the example vehicle of FIG. 5, illustrating the addition of example first and second bracketry (which may be the same bracketry) to a rear portion of the vehicle, and third bracketry to a front portion of the vehicle.
Figure 6B:
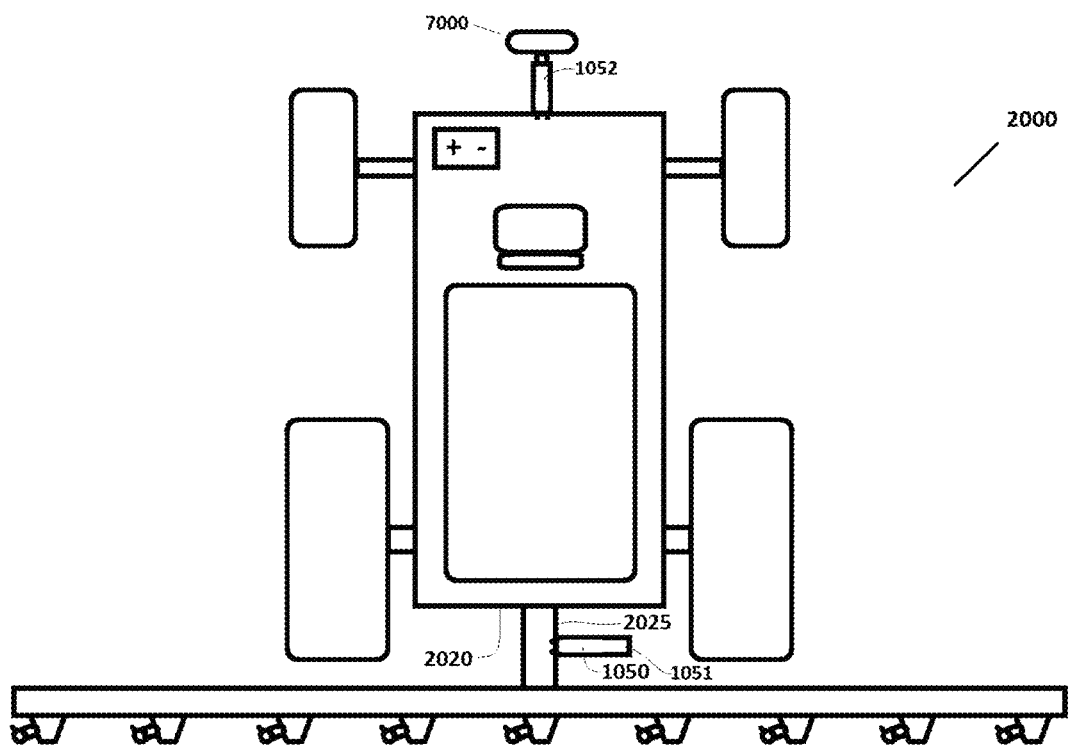
FIG. 6B is a top plan view of the example vehicle of FIG. 6A, illustrating the addition of an example LiDAR sensing system to the third bracketry on the front portion of the vehicle.
Figure 7:
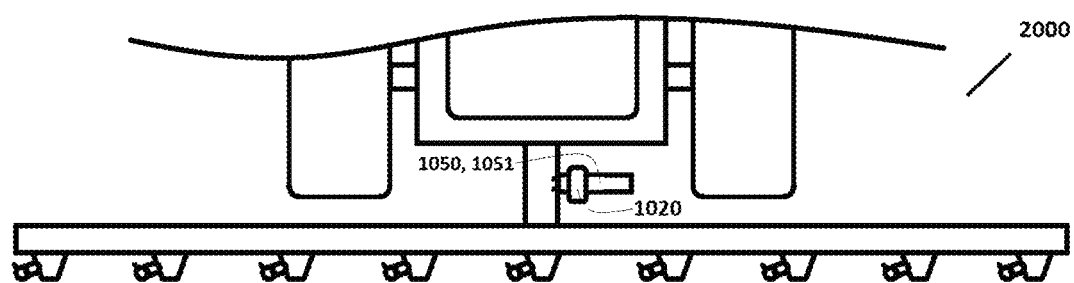
FIG. 7 is a partially cut-away top plan view of the example vehicle of FIG. 6A, illustrating the further addition of one or more example controllers to the first bracketry.
Figure 8:
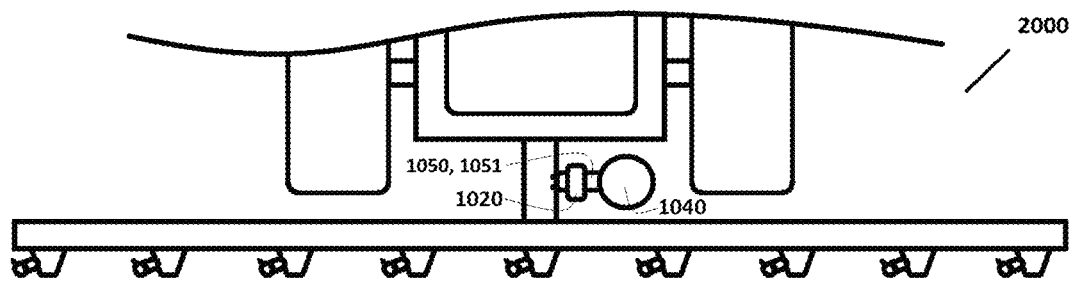
FIG. 8 is a partially cut-away top plan view of the example vehicle of FIG. 7, illustrating the addition of an example GPS antenna system to the second bracketry, which may be the same as, or different than, the first bracketry in various example embodiments.

FIGS. 4 and 5 illustrate installing a plurality of pulse-width-modulated solenoids 1010 in the ports 2250, with the arrows in FIG. 4 depicting the direction of installation, and FIG. 5 showing the assembly after installation. In various example embodiments, the pulse-width-modulated solenoids 1010 may be configured to fit where the check valves 2240 were located in the ports 2250 and to attach with or in the ports 2250 in the same or similar way that the check valves 2240 were attached into the ports 2250 (for instance by threading, or any other suitable attachment means). When so installed, the pulse-width-modulated solenoids 1010 can selectably turn individual nozzle assemblies 2230 on and off or varying their flow rate by retracting and extending, respectively, a retractable member into flow path of the liquid 2220 (in the form of a fog or mist) in the nozzle assemblies 2230.

FIGS. 6A, 6B, 7, and 8 illustrate attaching to the vehicle 2000 with bracketry 1050, 1051, 1052 (any or all of which may be the same or separate bracketry) one or more wirelessly-controllable solenoid controllers 1020, a GPS antenna system 1040 that wirelessly communicates information identifying its position, and a LiDAR sensing system 7000 that communicates data regarding sensed objects, either wirelessly or by wire. Additional details regarding example components, structure, and assembly of bracketry 1050, 1051, 1052 to example mounting structure 2025 on the rear area 2020 of an example vehicle 200 are provided in Shen et al. and in the incorporated '139 Application. Also provided in the incorporated '139 Application are details regarding example wirelessly-controllable solenoid controllers 1020 (including versions with both one and two such controllers 1020), and example GPS antenna systems 1040 that wirelessly communicate information identifying their position. Shen et al. provides details regarding example LiDAR systems 7000. In certain example embodiments of kits 1000, the one or more wirelessly-controllable solenoid controllers 1020 and the wireless GPS antenna system 1040 come pre-assembled to the bracketry 1050, 1051, which must merely then be attached to any suitable location on the vehicle 2000 using hardware provided, such as a plurality of brackets and fasteners. In certain example embodiments of kits 1000, the bracketry 1050, 1051, 1052 may be provided with adjustment means for adjusting the height of the components attached thereto, such as a plurality of mounting holes to choose from, for instance as shown in the incorporated '139 Application. Bracketry 1050, 1051, 1052 may comprise any suitable number of individual and varied brackets, fasteners, and related components, for instance to facilitate mounting the kit 1000 to a wide variety of different vehicles 2000, and any suitable material may be used for bracketry 1050, 1051, 1052 such as, for example, steel. It is understood that in alternative embodiments (not shown), the one or more wirelessly-controllable solenoid controllers 1020, the GPS antenna system 1040, and the LiDAR sensing system 7000 may all be affixed to the vehicle 2000 in approximately the same location using the same bracketry (e.g., 1050 or 1052).

Figure 9:
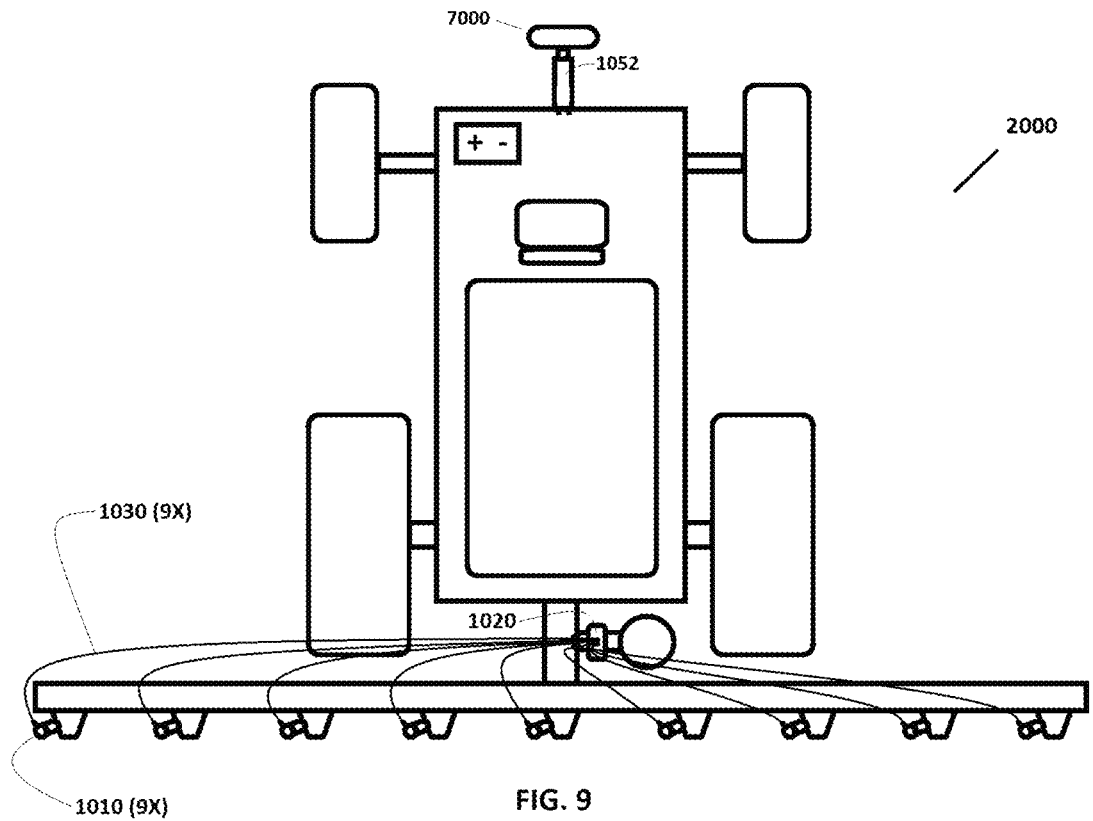
FIG. 9 is a top plan view of the example vehicle of FIG. 8, illustrating the addition of an example first wiring harness to connect the one or more controllers to the pulse-width-modulated solenoids.
Figure 10:
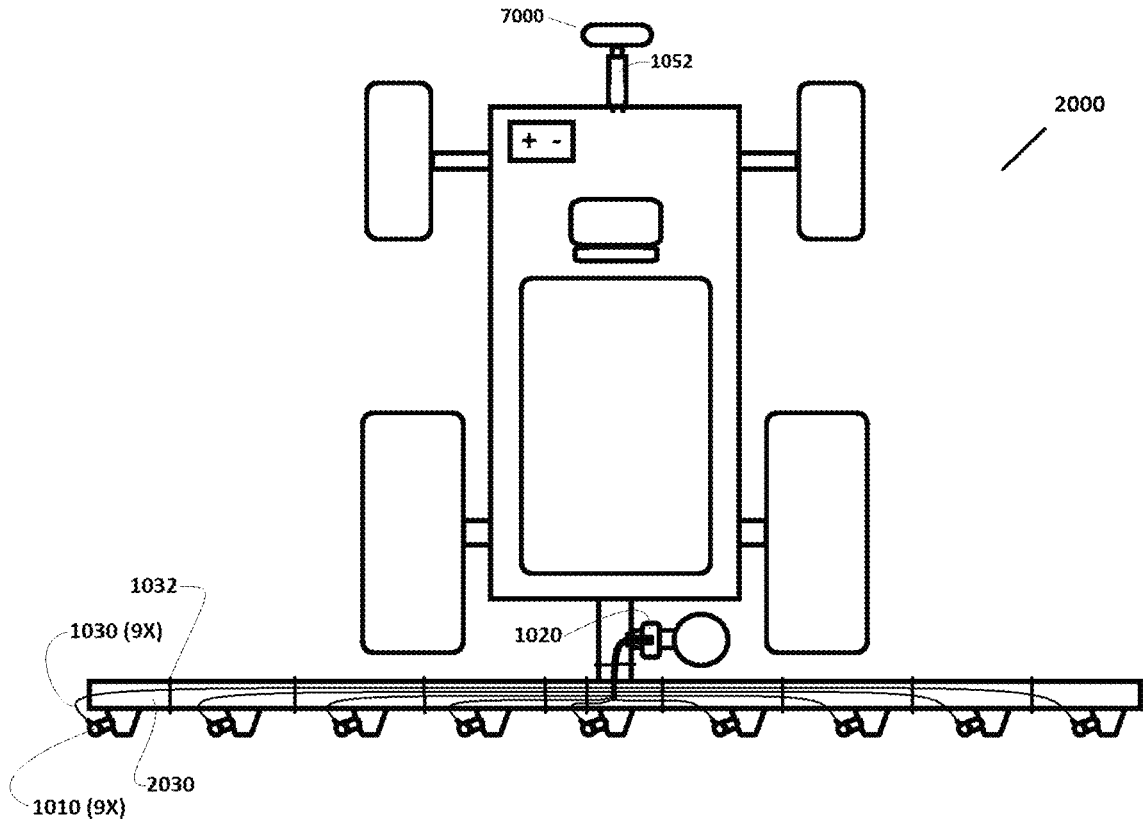
FIG. 10 is a top plan view of the example vehicle of FIG. 9, illustrating the attachment of the first wiring harness to the vehicle.

FIG. 9 illustrates connecting with the first wiring harness 1030 the one or more controllers 1020 with the plurality of pulse-width-modulated solenoids 1010, while FIG. 10 illustrates attaching the first wiring harness 1030 to the vehicle 2000, including to the nozzle-positioning structure 2030, for instance with a plurality of zip-ties 1032 or other similar connection means, which may be provided as part of the kit 1000. First wiring harness 1030 may comprise a number of individual, separate, pig-tails or other suitable wiring members, or may comprise wiring members that are joined together at least in part, or both. The wire members of the first wire harness 1030 may be individually tailored in length to be suitable for a given installation along a laterally extending nozzle-positioning structure 2030 of known length range. First wiring harness 1030 may comprise suitable plugs on the ends of the wire members to facilitate easy plugging and un-plugging of the first wiring harness 1030 from vehicle 2000.

Figure 11:
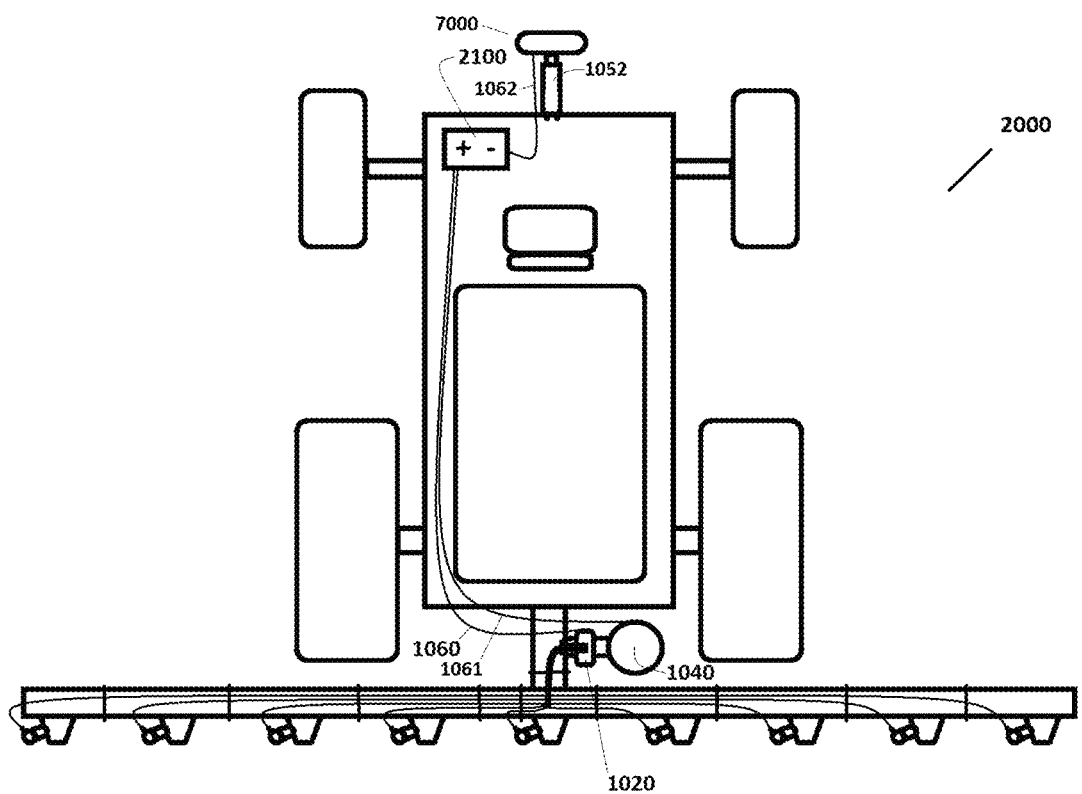
FIG. 11 is a top plan view of the example vehicle of FIG. 10, illustrating the addition of an example second wiring harness to connect the example one or more controllers to an example source of electrical power, and illustrating the addition of an example third wiring harness, which may be the same as, or different than, the second wiring harness in various example embodiments, to connect the example GPS antenna system to an example source of electrical power, and also illustrating the addition of an example third wiring harness to connect the example LiDAR sensing system to an example source of electrical power.

FIG. 11 illustrates connecting the source of electrical power 2100 with the second wiring harness 1060 to the one or more controllers 1020, with the third wiring harness 1061 to the GPS antenna system 1040, with the fourth wiring harness 1062 to the LiDAR sensing system 7000. Where the components are to be mounted proximate one another, one or more of the wiring harnesses 1060, 1061, and 1062 may be part of the same wiring harness. The source of electrical power 2100 may be located or electrically accessible at any location on the vehicle 2000.

Figure 12:
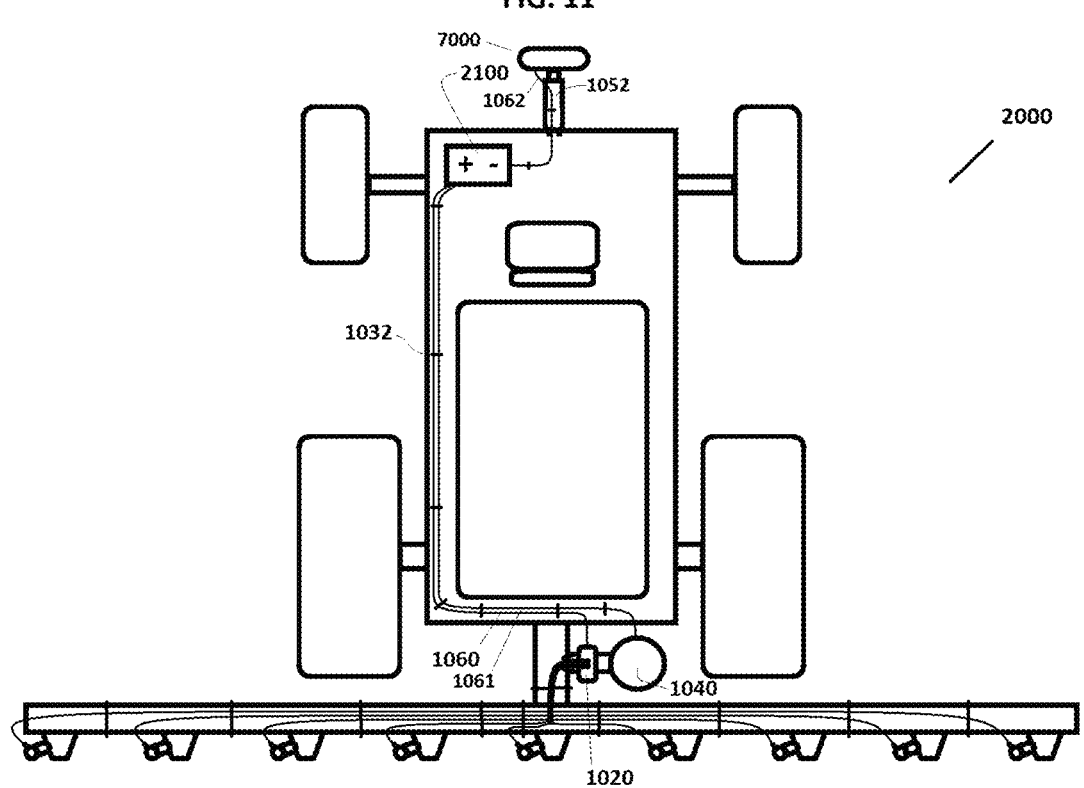
FIG. 12 is a top plan view of the example vehicle of FIG. 11, illustrating the attachment of the second, third, and fourth wiring harnesses to the vehicle.

FIG. 12 illustrates attaching the second wiring harness 1060, the third wiring harness 1061, and the fourth wiring harness 1062, to the vehicle 2000, for instance with a plurality of zip-ties 1032 or other similar connection means, which may be provided as part of the kit 1000. Second wiring harness 1060, third wiring harness 1061, and the fourth wiring harness 1062, may each comprise a number of individual, separate, wires, or may comprise wiring members that are joined together at least in part, or both. The wire members of the second wire harness 1060 and the third wiring harness 1061 may each be individually tailored in length to be suitable for mounting the GPS antenna system 1040 at various adjustable heights above the one or more controllers 1020. The second wiring harness 1060, third wiring harness 1061, and fourth wiring harness 1062, may each comprise suitable plugs or other attachment means on or for the ends of the wire members to facilitate easy attachment and removal of the wiring harnesses from vehicle 2000.

Figure 13:
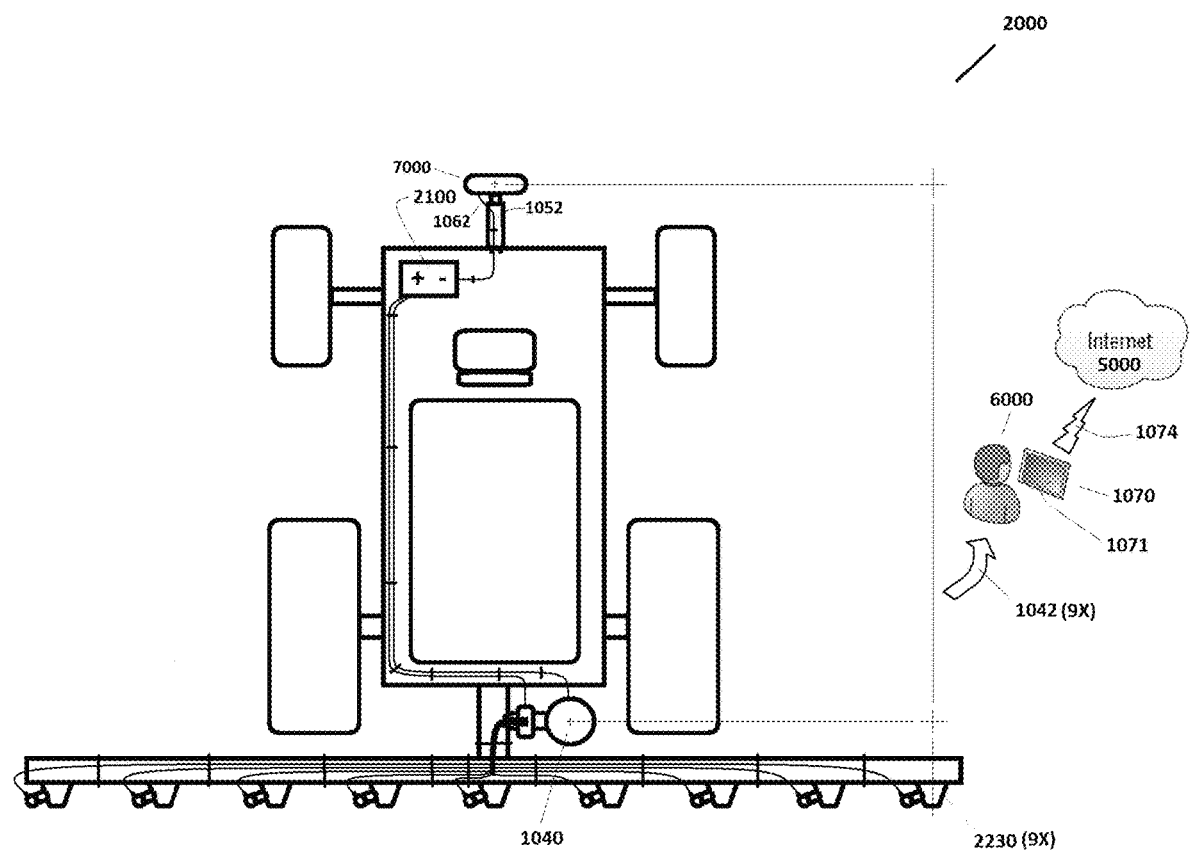
FIG. 13 is a top plan view of the example vehicle of FIG. 12, illustrating the steps of measuring and recording vehicle data regarding the relative locations of the nozzle assemblies with respect to the example GPS antenna system and with respect to the example LiDAR sensing system.

FIG. 13 illustrates a user 6000 using the screen or display 1071 of a mobile device 1070 to enter vehicle data 1042 into one or more databases (not shown), which may be located partially or entirely in the mobile device 1070, or partially or entirely remotely, such as in the cloud 5000 (i.e., on the Internet wirelessly accessible 1074 from the mobile device 1070). Vehicle data 1042 may include, for example, measurements (such as distances fore and aft, left and right) individually defining the dimensional locations of each of the nozzle assemblies 1010 relative to the location of the GPS antenna system 1040 and relative to the location of the LiDAR system 7000 when installed on the vehicle 2000. At this stage or at another time the user 6000 can enter user-defined criteria into the mobile device 1070 to provide various parameters to the software in the mobile device 1070, for instance, bringing up prior spray maps or recording new spray maps, or both, providing information regarding boundaries or paths where to spray, what type of objects to spray in spray regions (e.g., by identifying vertical height ranges or upper or lower limits, by plant density, by identifying individual plants by looking for and identifying tree trunks, for instance, and by maximum sensed horizontal distance away from the spray nozzles 2230), what flow rate to spray, and overlap in spraying distance before and after a sensed object. Mobile device 1070 can be any suitable electronic device that by itself or in conjunction with other devices, has the capacity to receive data input, store it, process it, and communicate data wirelessly (this includes by way of example and not limitation, smart phones, tablets, laptop computers, and any other suitable wireless electronics). Regarding, among other things, inputting certain user-defined criteria, examples are provided in U.S. Pat. No. 9,851,718 B2 to Booher, entitled Intelligent Control Apparatus, System, and Method of Use and issued Dec. 26, 2017, and in the provisional patent application to which it claims priority, Provisional application No. 62/056,470, filed on Sep. 26, 2014, both of which are incorporated herein by reference in their entireties.

Figure 14:
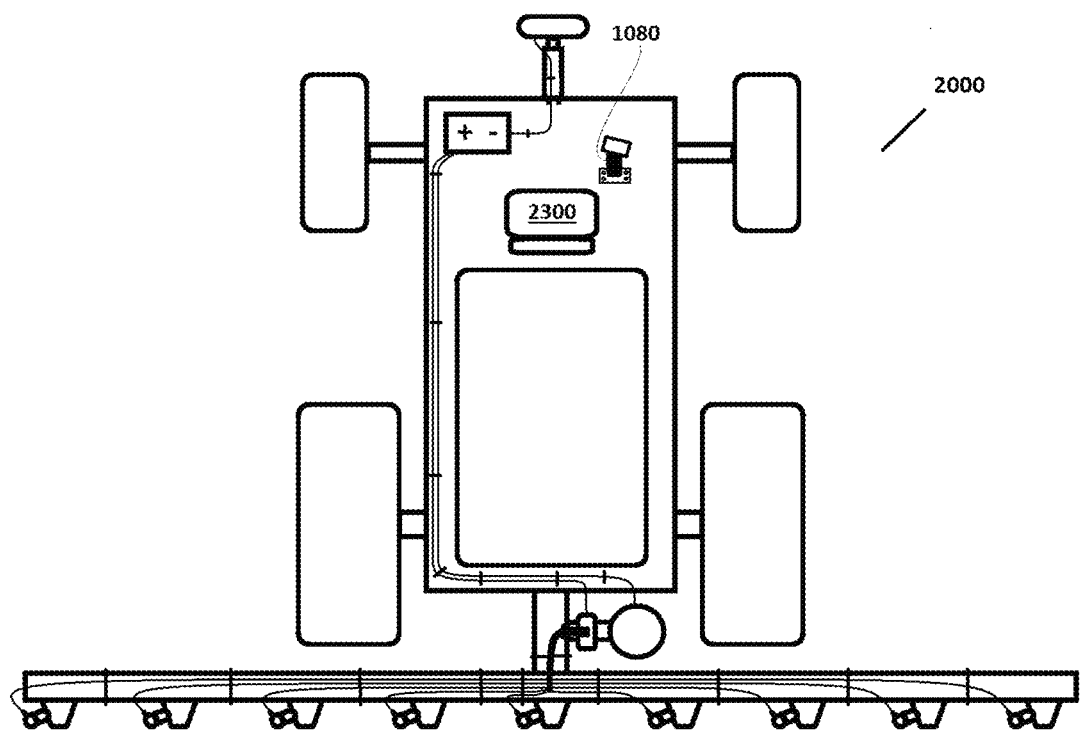
FIG. 14 is a top plan view of the example vehicle of FIG. 13, illustrating the addition of example fourth bracketry to a driver seating area of the vehicle.
Figure 15:
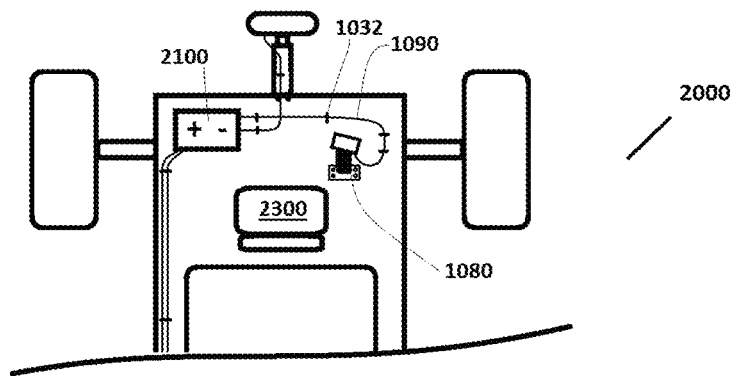
FIG. 15 is a partially cut-away top plan view of the example vehicle of FIG. 14, illustrating the addition of an example fifth wiring harness to connect example fourth bracketry to an example source of electrical power.
Figure 16:
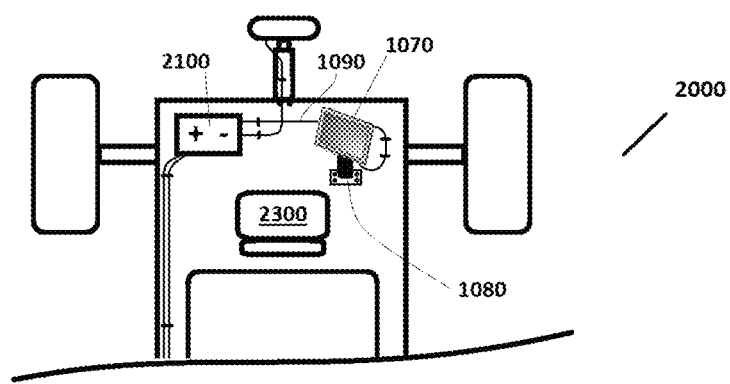
FIG. 16 is a partially cut-away top plan view of the example vehicle of FIG. 15, illustrating removably connecting an example mobile device to the example fourth bracketry such that the mobile device can receive electrical power from the fifth wiring harness.

FIGS. 14, 15, and 16 illustrate mounting and wiring the mobile device 1070 proximate the driver's seating location 2300 in the vehicle 2000, so that the user 6000 can view or interact with the mobile device 1070, or both, while seated in the seating location 2300. Fourth bracketry 1080 may be provided and attached with the vehicle 2000 that is configured to attach the mobile device 1070 with the vehicle 2000 near a driver's location 2300 on the vehicle 2000. Fourth bracketry 1080 may provide for easy removal and replacement of the mobile device 1070 from the bracketry 1080, or may provide a locking or other mechanism to removably secure or protect or both, the mobile device 1070. A fifth wiring harness 1090 may be configured to be attached to the vehicle 2000 and to electrically connect the mobile device 1070 with the source of electrical power 2100, which may be located or electrically accessible at any location on the vehicle 2000, when the mobile device 1070 is attached with the vehicle 2000 near the driver's location 2300 on the vehicle 2000. FIG. 15 best illustrates attaching the fifth wiring harness 1090 to the vehicle 2000, for instance with a plurality of zip-ties 1032 or other similar connection means, which may be provided as part of the kit 1000. Fifth wiring harness 1090 may comprise a number of individual, separate, wires, or may comprise wiring members that are joined together at least in part, or both. Fifth wiring harness 1090 may comprise suitable plugs or other attachment means on or for the ends of the wire members to facilitate easy attachment and removal of the fifth wiring harness 1090 from vehicle 2000.

Figure 17:
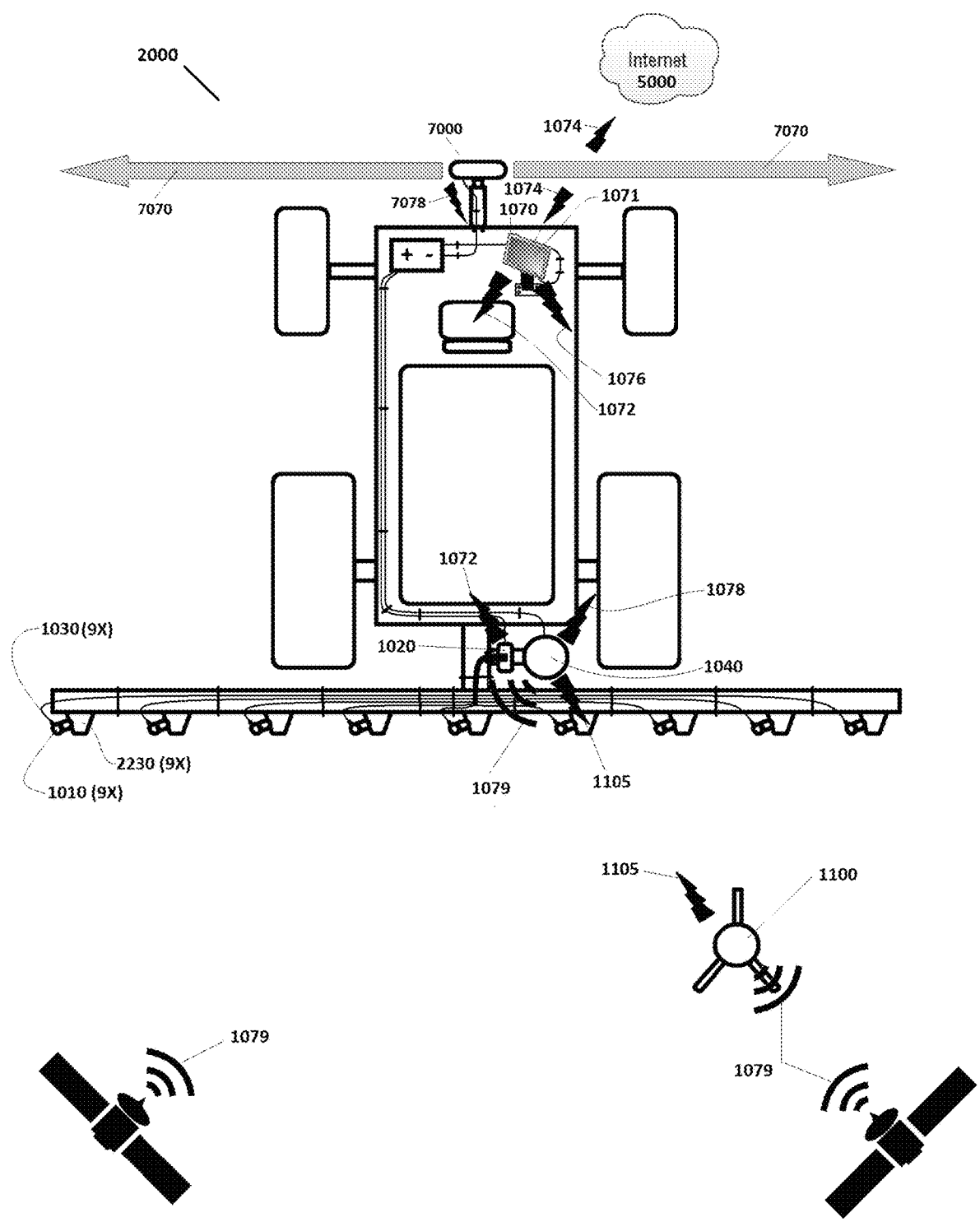
FIG. 17 is a top plan view of the example vehicle of FIG. 16, illustrating the example vehicle of FIG. 1A with an example kit according to various example embodiments installed and functioning on the vehicle.

FIG. 17 illustrates various example aspects of wireless and other communication that may be taking place on the vehicle 2000 once an example kit 1000 has been installed and is in-use. LiDAR sensing system 7000 emits a laser beam 7070 radially outward from the LiDAR sensing system 7000, typically in a vertical plane perpendicular to the direction of travel of the vehicle 2000, for instance as shown in FIGS. 17 and 23B. The LiDAR system 7000 detects reflections of the laser beam 7070 that correspond to the presence, location (vertical and horizontal distance from the LiDAR sensing system 7000), and density of certain objects, such as trees or other plants, to be sprayed according to the user-defined criteria. This LiDAR sensed information 7078 is then communicated wirelessly (for instance where the LiDAR sensing system 7000 includes a WiFi router, not separately shown), or alternatively by wire such as a USB cable (not shown), to the mobile device 1070. McPeek and Shen et al. provide additional information regarding example LiDAR systems 7000.

With continuing reference to FIG. 17, the GPS antenna system 1040 receives GPS satellite location signals 1079, typically from satellites in space. Optionally and absent in certain embodiments, the GPS antenna system 1040 may also receive correction radio frequency signals 1105 from a stationary differential ground station 1100, which may already exist nearly, or may be provided as part of the kit 1000 in certain example embodiments. The stationary differential ground station 1100 receives GPS satellite location signals 1079, typically from satellites in space, and sends out a correction signal 1105 from a fixed location, which GPS antenna systems 1040 can use to correct their position readings. Further details regarding example GPS antenna systems 1040 is provided in the incorporated '139 Application. Additional information regarding these types of GPS systems is provided in the Teach patent, which is incorporated herein by reference.

Further referencing FIG. 17, the mobile device 1070 may communicate wirelessly 1076 with the GPS antenna system 1040, and may wirelessly receive geographic location information 1078 from the GPS antenna system 1040. Based on a real-time comparison of the geographic location information 1078 received from the GPS antenna system 1040, and the LiDAR sensed information 7078 received from the LiDAR sensing system 7000, to user-selected criteria and boundary mapping information, which the mobile device 1070 may have obtained (or be obtaining in real-time) in a number of ways, including by direct input of the user 6000 and wirelessly 1074 from the Internet 5000, and based on vehicle data 1042 indicating where each nozzle assembly 2230 is located relative to the GPS antenna system 1040 and relative to the LiDAR sensing system 7000, the mobile device 1070 may determine whether each nozzle assembly 2230 is presently located sufficiently proximate a spray region 3000 or a no-spray region 4000, and if sufficiently proximate a spray region 3000, also whether and how much to vary the spray output based on sensed plant density, spraying distance, or any other user-selected criteria. Based on the outcome of that determination, the mobile device 1070 may wirelessly transmit on, off, and flow-rate signals 1072 to the one or more controllers 1020, which then send signals through the first wiring harness 1030 to the corresponding pulse-width-modulated solenoids 1010 to turn on, turn off, or vary the flow rate of liquid 2220 (in the form of a fog or mist) through each individual nozzle assembly 2230. The user 6000, which may be the driver of the vehicle 2000, may in various example embodiments be able to view on the display or screen 1071 a dynamic map image depicting the real-time travel path and spraying coverage area of the vehicle 2000, including spray regions 3000, no-spray regions 4000, two-dimensional or even three-dimensional "heat maps" showing how much has been sprayed throughout the spray regions 3000, boundaries 3500 between those regions, and spray regions 3000 that have been sprayed and thus have become for the rest of that project or work day (or other period of time), no-spray regions 4000 for purposes of controlling the pulse-width-modulated solenoids 1010 (but not necessarily for the purposes of map display). The figures, drawings, photographs, and detailed written description in the incorporated '139 Application, including its own incorporations by reference, illustrate certain example aspects of a mobile device 1070 and its software and interface, wherein pages 000032 to 000098 provide example views and information regarding one or more screen interfaces as viewable by a user of an example system, pages 000099 to 000147 provide example views and information regarding an example web portal for use in connection with example system embodiments, and pages 000148 to 000182 provide example information regarding software that may be used in connection with example embodiments of the various components.

Figure 18:
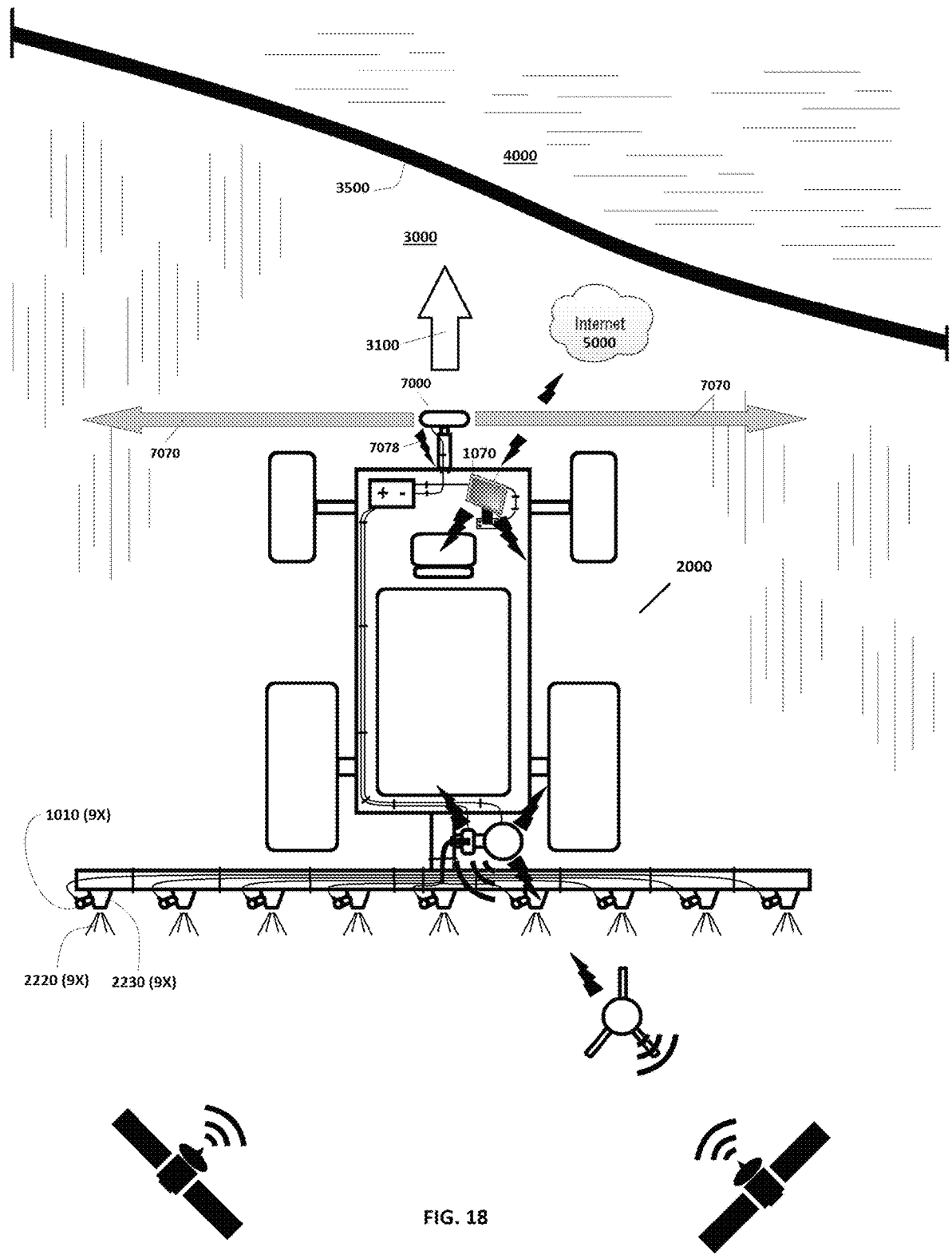
FIG. 18 is a top plan view of the example vehicle of FIG. 17, illustrating the vehicle located in a spray region and moving toward a no-spray region, with all nozzle assemblies spraying.

FIGS. 18-21 depict the vehicle 2000 with kit 1000 installed and in use as described with respect to FIG. 17. FIG. 18 shows the vehicle 2000 located in a spray region 3000 (indicated by shading marks running lengthwise up and down the page) and traveling in the direction of the arrow 3100 (forward) toward a no-spray region 4000 (indicated by shading marks running crosswise left and right across the page), and toward a digitally-defined border 3500 between the spray region 3000 and the no-spray region 4000. Since all of the nozzle assemblies 2230 on the vehicle 2000 in FIG. 18 are located within a spray region 3000, all the pulse-width-modulated solenoids 1010 are turned on (or otherwise actuated) to allow the flow of the liquid 2220 (in the form of a fog or mist) through each nozzle assembly 2230.

Figure 19:
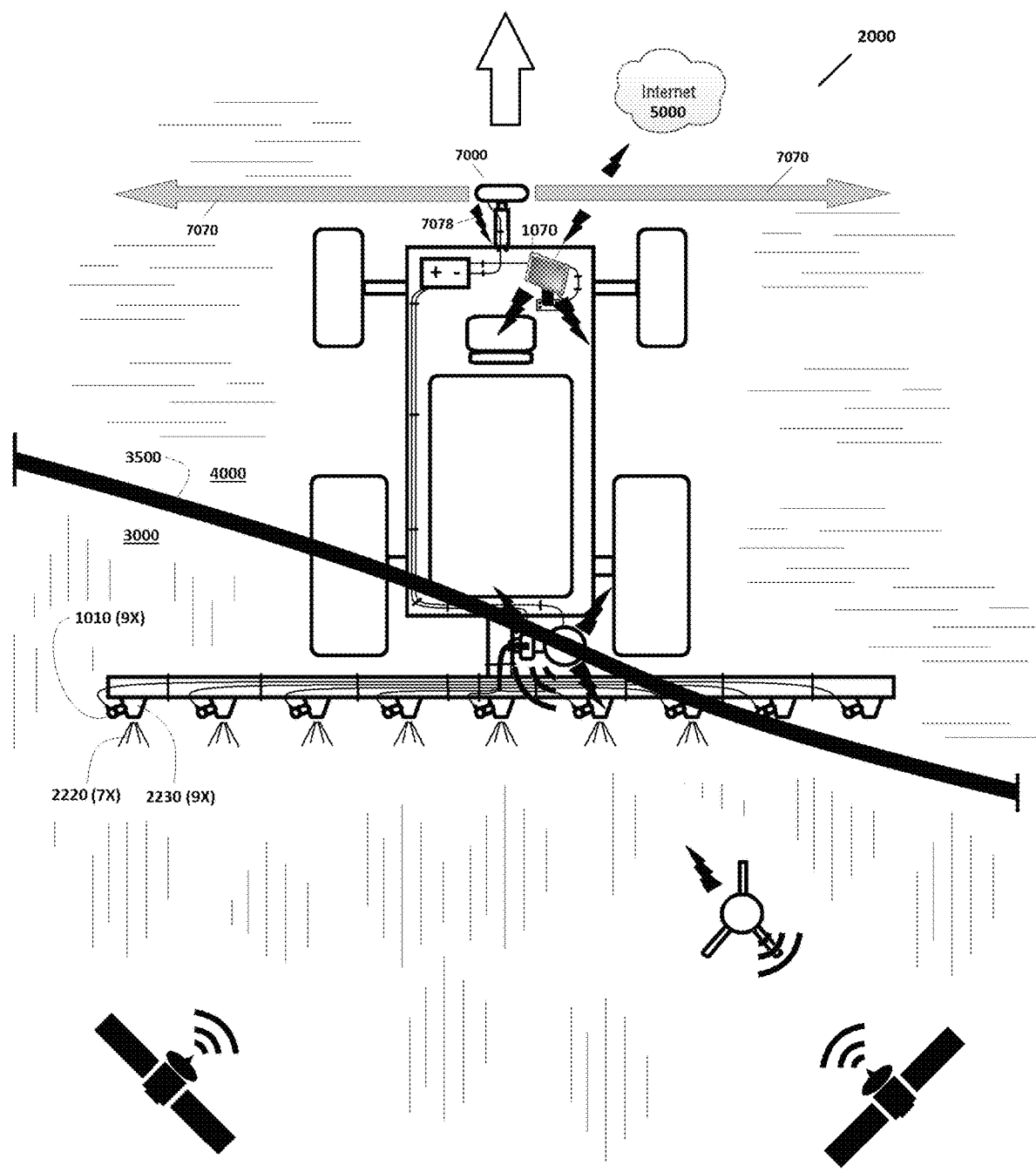
FIG. 19 is a top plan view of the example vehicle of FIG. 18, illustrating the vehicle moving across a boundary from the spray region into the no-spray region, with the nozzle assemblies still in the spray region spraying, and the nozzle assemblies in the no-spray region shut off.

FIG. 19 then shows the vehicle 2000 located partially in the spray region 3000 (indicated by shading marks running lengthwise up and down the page) and still traveling in the direction of the arrow toward and now partially through the no-spray region 4000 (indicated by shading marks running crosswise left and right across the page), and partially through the digitally-defined border 3500 between the spray region 3000 and the no-spray region 4000. Since now only seven of the nine nozzle assemblies 2230 on the vehicle 2000 in FIG. 18 are located within the spray region 3000 (while two of the nine nozzle assemblies 2230 are located within the no-spray region 4000), only the seven pulse-width-modulated solenoids 1010 that are located within the spray region 3000 are turned on (or otherwise actuated) to allow the flow of the liquid 2220 (in the form of a fog or mist) through each of those seven nozzle assemblies 2230. The two pulse-width-modulated solenoids 1010 that are located within the no-spray region 4000 are turned off (or otherwise actuated) to stop the flow of the liquid 2220 (in the form of a fog or mist) through those two nozzle assemblies 2230.

Figure 20:
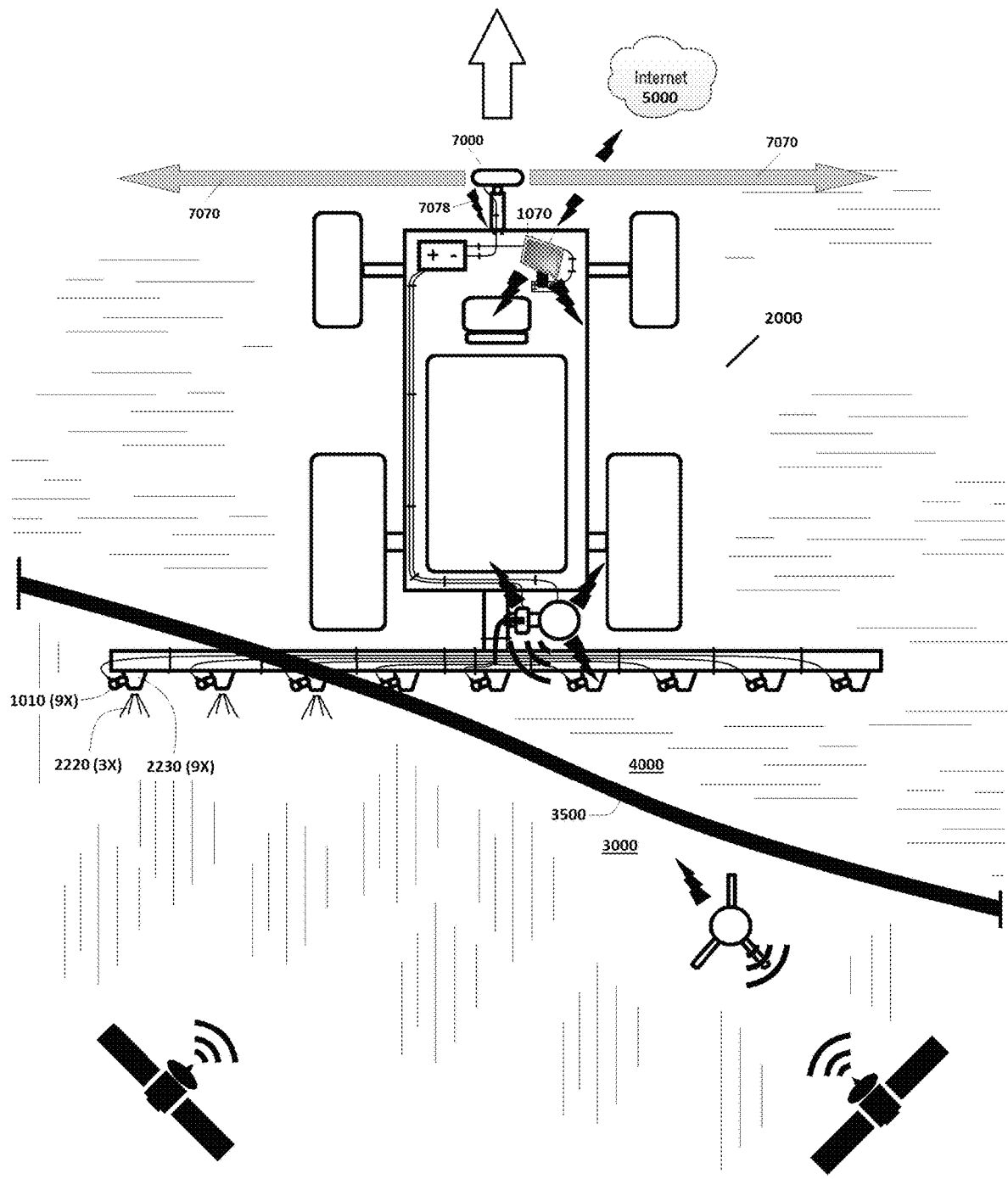
FIG. 20 is a top plan view of the example vehicle of FIG. 19, illustrating the vehicle moving further across the boundary from the spray region into the no-spray region, with the nozzle assemblies still in the spray region spraying, and the nozzle assemblies in the no-spray region shut off.

Next, FIG. 20 shows the vehicle 2000 departing the spray region 3000 (indicated by shading marks running lengthwise up and down the page) and still traveling in the direction of the arrow into the no-spray region 4000 (indicated by shading marks running crosswise left and right across the page), while crossing the digitally-defined border 3500 between the spray region 3000 and the no-spray region 4000. Since now only three of the nine nozzle assemblies 2230 on the vehicle 2000 in FIG. 18 are located within the spray region 3000 (while six of the nine nozzle assemblies 2230 are located within the no-spray region 4000), only the three pulse-width-modulated solenoids 1010 that are located within the spray region 3000 are turned on (or otherwise actuated) to allow the flow of the liquid 2220 (in the form of a fog or mist) through each of those three nozzle assemblies 2230. The six pulse-width-modulated solenoids 1010 that are located within the no-spray region 4000 are turned off (or otherwise actuated) to stop the flow of the liquid 2220 (in the form of a fog or mist) through those six nozzle assemblies 2230.

Figure 21:
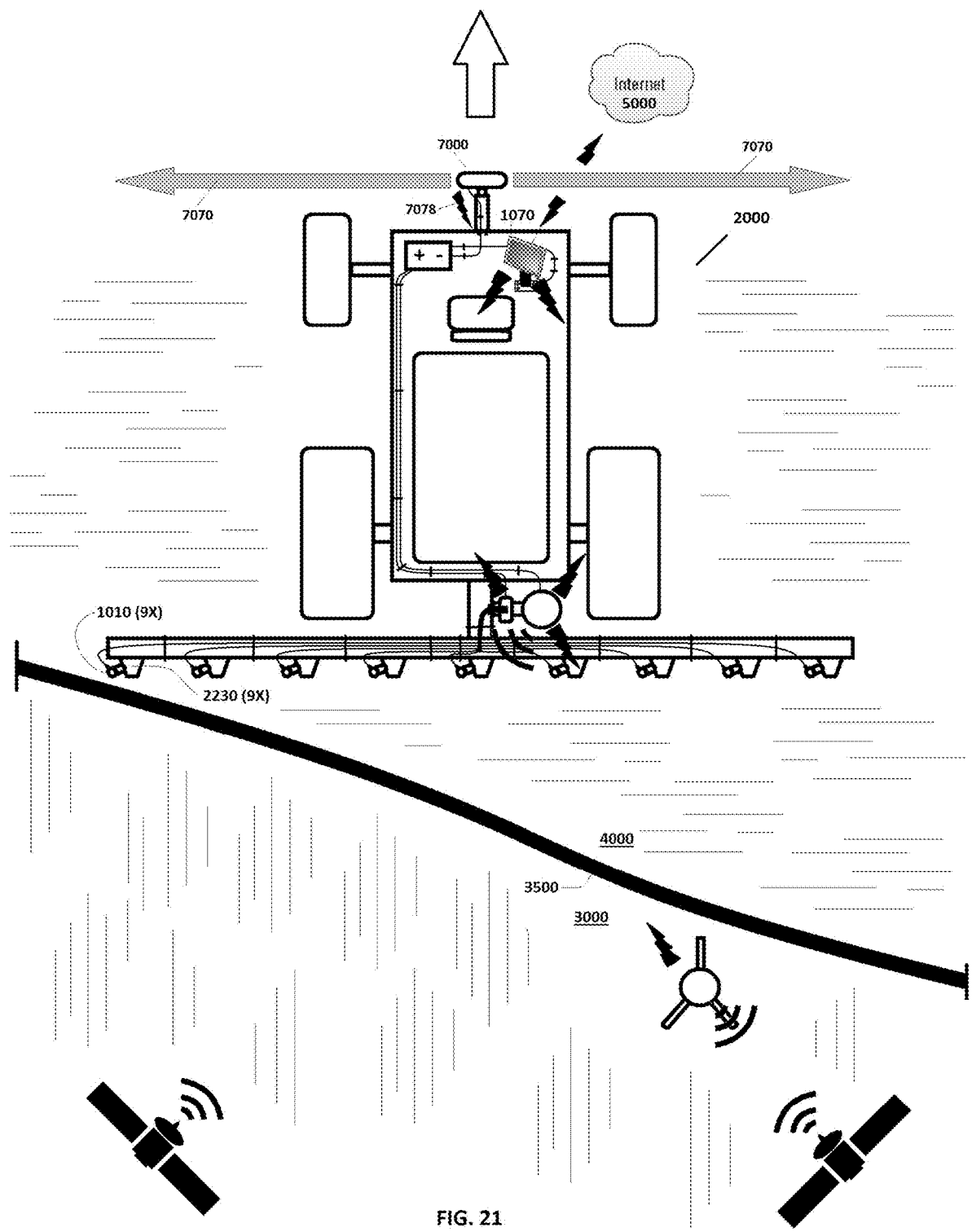
FIG. 21 is a top plan view of the example vehicle of FIG. 20, illustrating the vehicle having moved all the way across the boundary from the spray region into the no-spray region, with all the nozzle assemblies shut off since they are now all in the no-spray region.

FIG. 21 then shows the vehicle 2000 having fully departed the spray region 3000 (indicated by shading marks running lengthwise up and down the page) and still traveling in the direction of the arrow entirely within the no-spray region 4000 (indicated by shading marks running crosswise left and right across the page). Since now none of the nine nozzle assemblies 2230 on the vehicle 2000 in FIG. 18 are located within the spray region 3000 (while all of the nine nozzle assemblies 2230 are located within the no-spray region 4000), none of the pulse-width-modulated solenoids 1010 are located within the spray region 3000 so none are turned on (or otherwise actuated) to allow the flow of the liquid 2220 (in the form of a fog or mist) through their corresponding nozzle assemblies 2230. All nine pulse-width-modulated solenoids 1010 are located within the no-spray region 4000 and are turned off (or otherwise actuated) to stop the flow of the liquid 2220 (in the form of a fog or mist) through all nine nozzle assemblies 2230.

Figure 22:
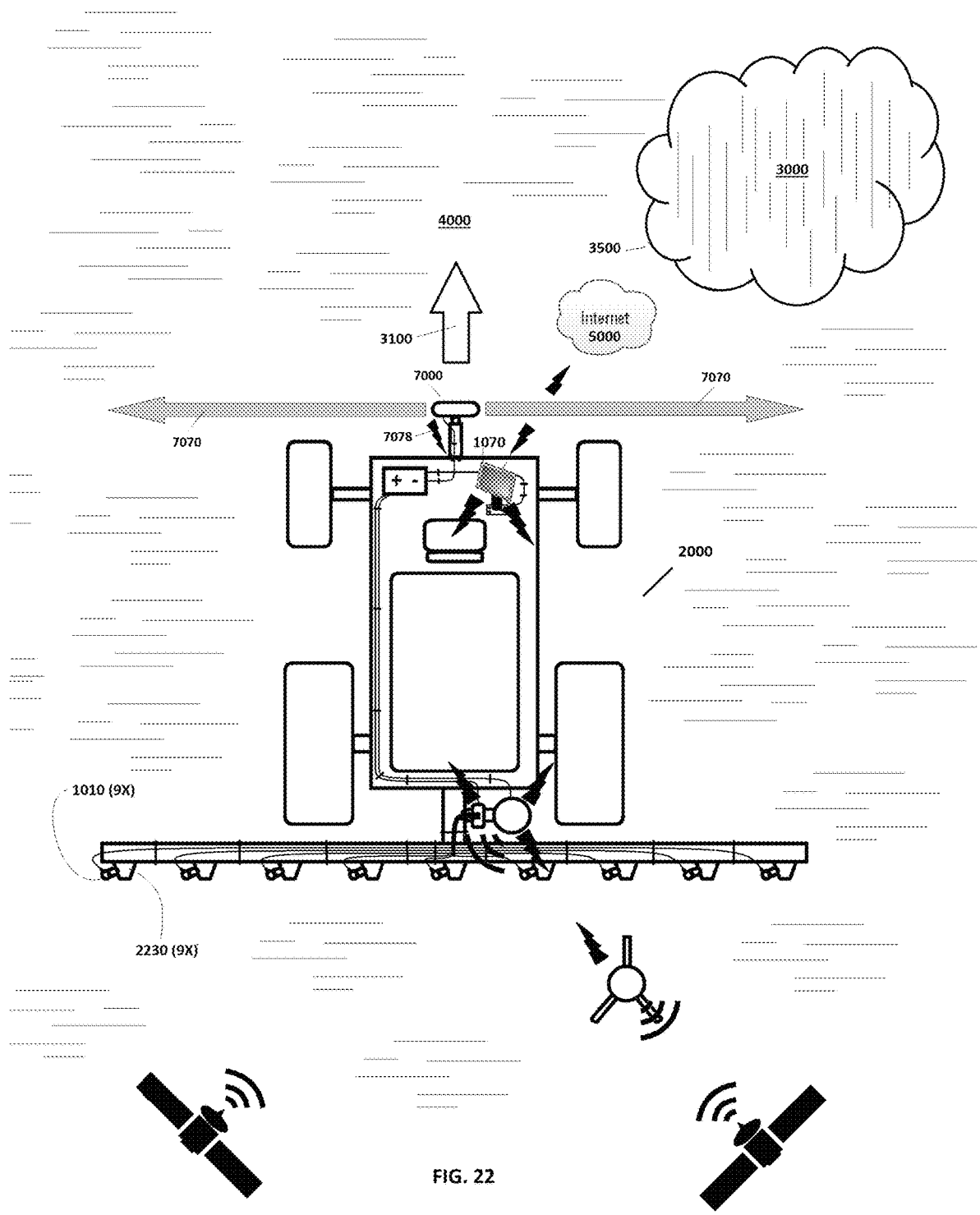
FIG. 22 is a top plan view of the example vehicle of FIG. 21, illustrating the vehicle traversing a no-spray region toward a tree or other plant(s) that the vehicle will sense, interpret, and record the location of, according to user-defined criteria, as a spray region having vertical and horizontal components, and then spray with spray nozzles that are sufficiently proximate the spray area as the vehicle passes the tree or other plant(s), either in real time or during a subsequent pass, according to various example embodiments.

FIG. 22 shows the vehicle 2000 traversing a no-spray region toward a spray region 3000 comprising a tree or other plant(s), which the vehicle 2000 with the kit 1000 installed will sense, interpret, and record the location of, according to user-defined criteria, as a spray region 3000 having vertical and horizontal components, and then spray with spray nozzles 2230 that are sufficiently proximate the spray region 3000 as the vehicle 2000 passes the tree or other plant(s) constituting the spray region 3000, either in real time or during a subsequent pass.

Figure 23A:
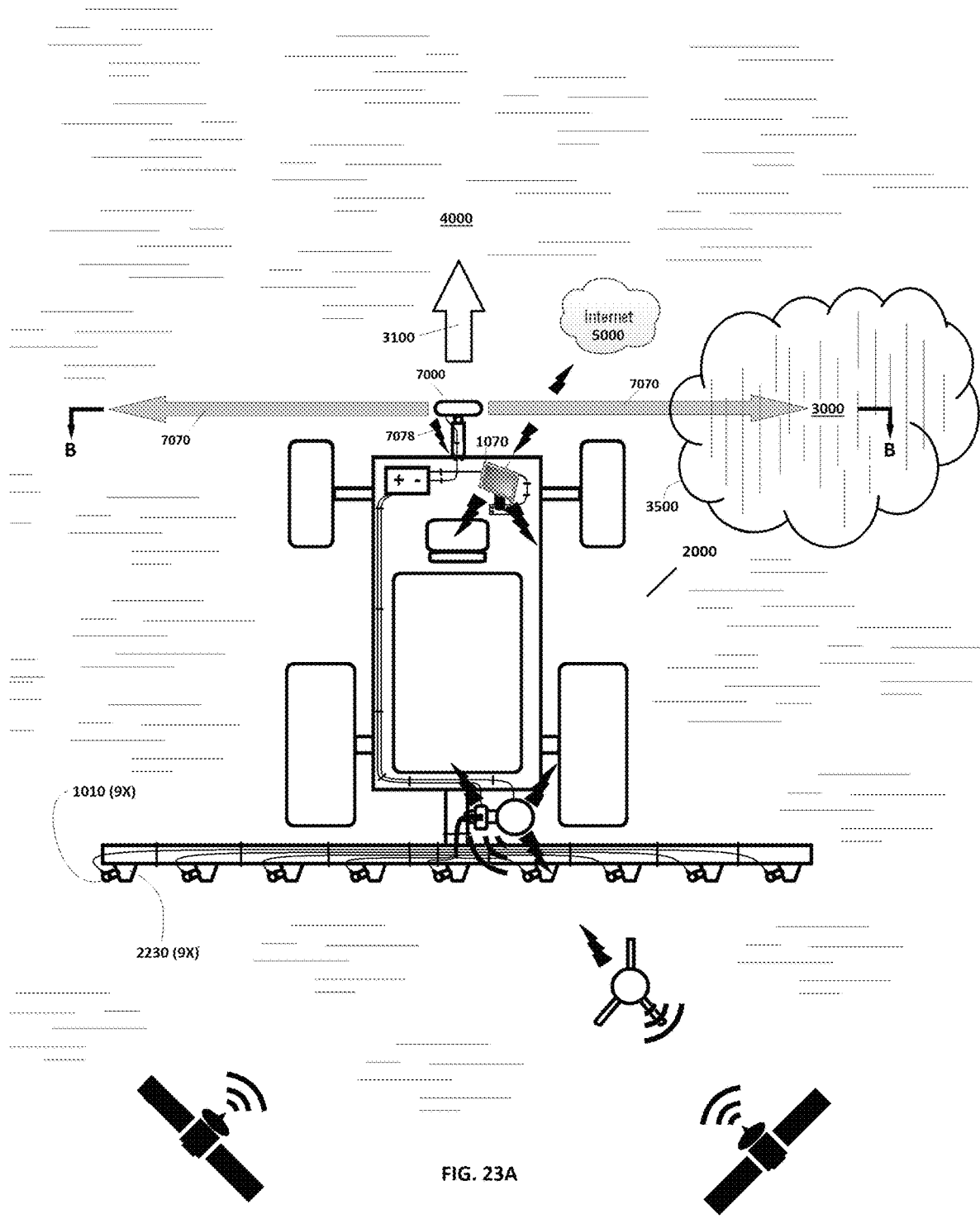
FIG. 23A is a top plan view of the example vehicle of FIG. 22, illustrating the vehicle's example LiDAR system moving proximate a tree or other plant(s) that the vehicle is sensing, interpreting, and recording the location of, according to user-defined criteria, as a spray region having vertical and horizontal components, according to various example embodiments.
Figure 23B:
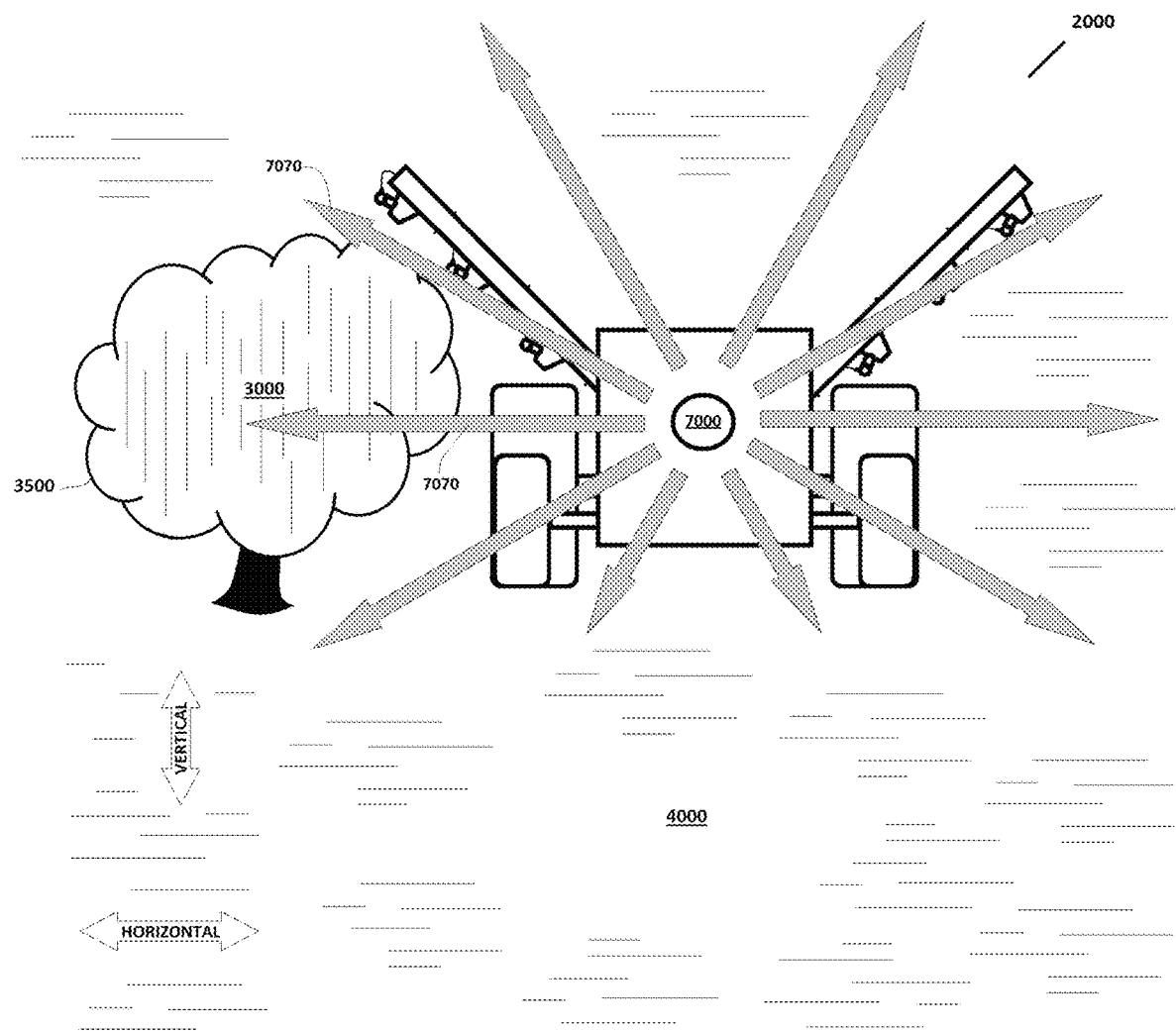
FIG. 23B is a front elevation view of the example vehicle of FIG. 23A taken in the direction indicated by arrows B-B.

FIGS. 23A and 23B show the vehicle 2000 having begun to reach the tree or other plant(s) constituting the spray region 3000, illustrating the LiDAR sensing system 7000 emitting a laser beam 7070 radially outward from the LiDAR sensing system 7000 in a vertical plane perpendicular to the direction of travel of the vehicle 2000. The LiDAR system 7000 detects reflections of the laser beam 7070 that correspond to the presence, location (vertical and horizontal distance from the LiDAR sensing system 7000), and density of the tree or other plant(s) constituting the spray region 3000, thereby defining according to the user-defined criteria the boundary 3500 of the spray region 3000 to be sprayed. As the vehicle 2000 proceeds forward 3100 such that the LiDAR sensing system 7000 moves past the tree or other plant(s) constituting the spray region 3000, data representing a three-dimensional outer profile or boundary 3500 of the spray region 3000 is generated, which may comprise plant data corresponding to one or more of locations, heights, widths, shapes, and densities of plants located within the spray regions 3000. This LiDAR sensed information 7078 is then communicated wirelessly (for instance where the LiDAR sensing system 7000 includes a WiFi router, not separately shown), or alternatively by wire such as a USB cable (not shown), to the mobile device 1070. In combination with the geographic location (including orientation) information 1078 received wirelessly from the GPS antenna system 1040, and vehicle speed information, the mobile device 1070 may thereafter determine whether each nozzle assembly 2230 is presently located sufficiently proximate a spray region 3000 as the vehicle 2000 continues moving, for instance in the forward direction 3100. The LiDAR sensed information 7078 may simultaneously be overlaid with vehicle speed information and geographic location information 1078 from the GPS antenna system 1040 and recorded for future evaluation and re-use. Alternatively, the determination whether each nozzle assembly 2230 is presently located sufficiently proximate a spray region 3000 as the vehicle 2000 continues moving, may be made by comparing presently-sensed vehicle speed, orientation, and geographic location information 1078 from the GPS antenna system 1040, to previously-recorded LiDAR sensed information 7078 that is overlaid with previously-recorded vehicle speed, orientation, and geographic location information 1078 from the GPS antenna system 1040. In other words, the system may function based at least in part on previously-recorded data instead of based on real-time sensing of current conditions.

Figure 24A:
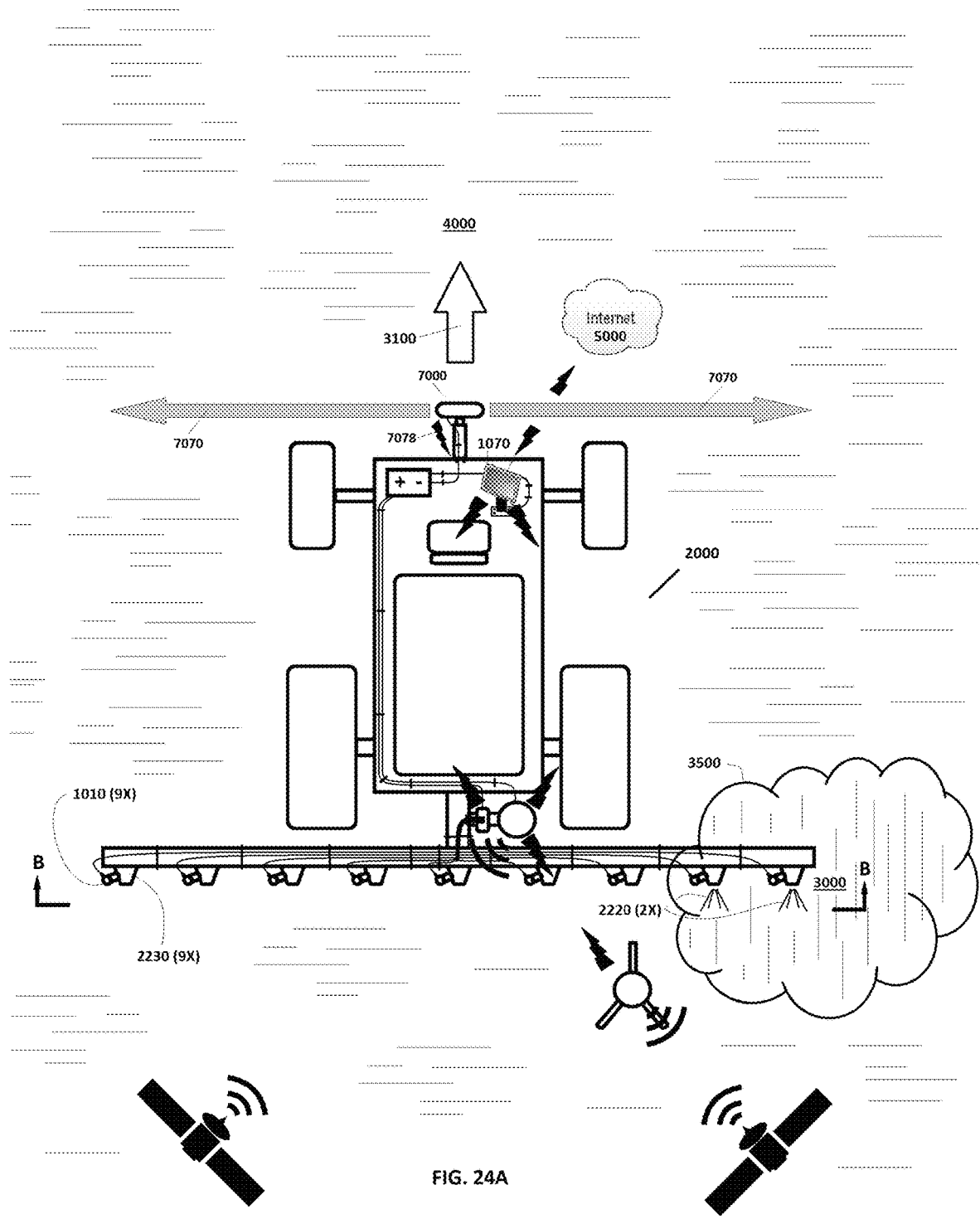
FIG. 24A is a top plan view of the example vehicle of FIG. 23A, illustrating certain example spray nozzles of the vehicle moving proximate and turning on and spraying the tree or other plant(s) that the vehicle has, either in real time or during a prior pass, sensed, interpreted, and recorded the location of, according to user-defined criteria, as a spray region having vertical and horizontal components, according to various example embodiments.
Figure 24B:
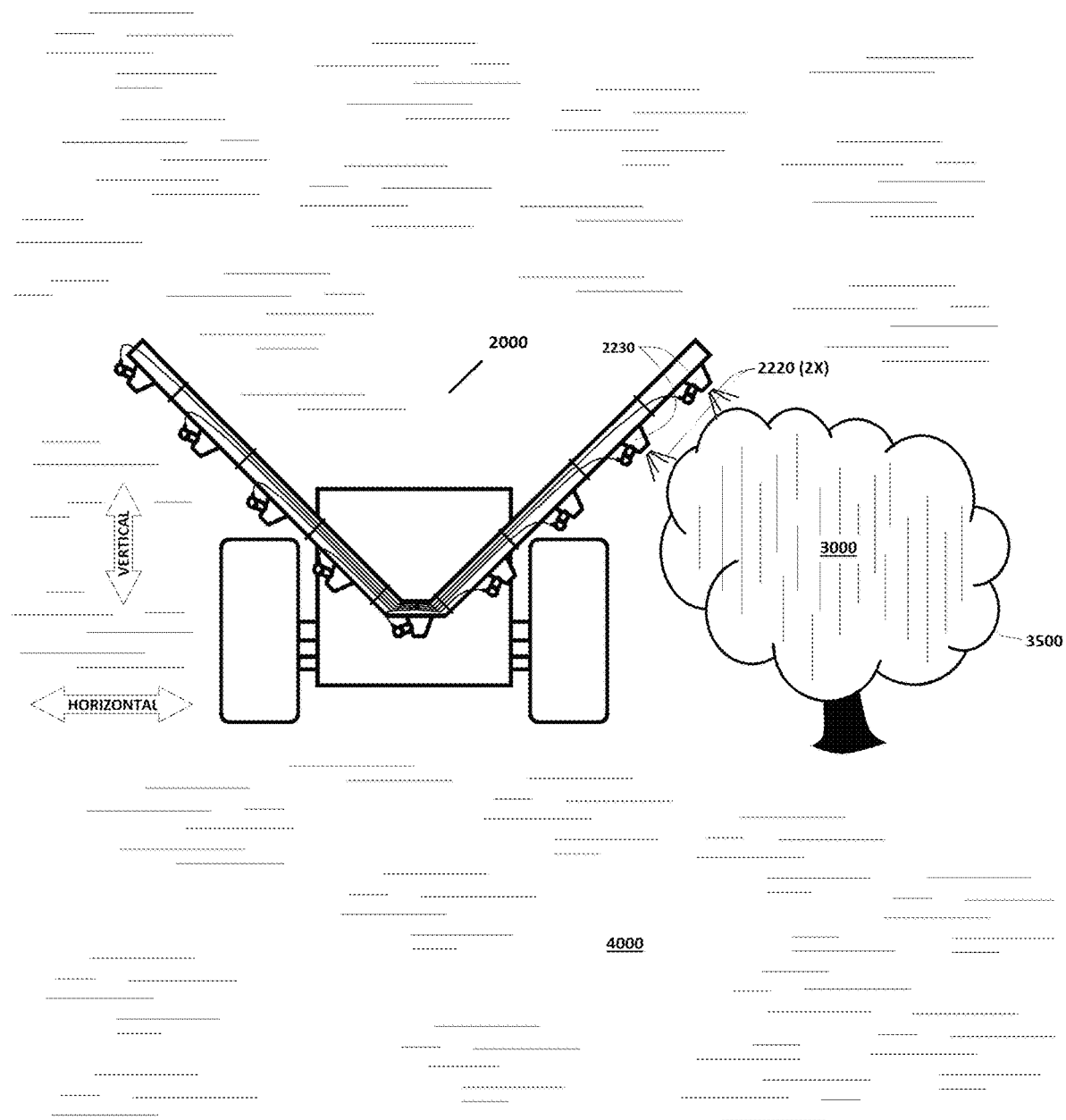
FIG. 24B is a rear elevation view of the example vehicle of FIG. 24A taken in the direction indicated by arrows B-B.

As depicted in FIGS. 24A and 24B, as each nozzle assembly 2230 is determined by the mobile device 1070 to have become sufficiently proximate a spray region 3000, the mobile device 1070 may wirelessly transmit on signals and flow-rate signals (collectively depicted as 1072 in FIG. 17) to the one or more controllers 1020, which then send signals through the first wiring harness 1030 to the corresponding pulse-width-modulated solenoids 1010 to turn on and vary the flow rate of liquid 2220 (in the form of a fog or mist) through the corresponding individual nozzle assemblies 2230, in view of, for example, sensed plant density, spraying distance, and any user-selected criteria. As best seen in FIG. 24B, nozzles that are not sufficiently proximate the spray region 3000 as determined by the mobile device 1070, whether by horizontal distance or vertical distance or nozzle direction or any combination or function of the foregoing factors, are switched off by the one or more controllers 1020 to conserve the liquid 2220 being sprayed and optimize spraying efficiency and efficacy.

In various example embodiments a method of using a vehicle 2000 as described herein may further comprise the steps of entering vehicle data 1042 into the one or more databases defining the locations of each of the nozzle assemblies 2230 relative to the location of the GPS antenna system 1040 when installed on the vehicle 2000. In various example embodiments the steps of entering vehicle data into the one or more databases may comprise the steps of entering map data into the one or more databases defining spray regions 3000 and no-spray regions 4000. In various example embodiments the steps of entering vehicle data into the one or more databases may comprise the steps of driving the vehicle 2000 along one or more edges 3500 of one or more spray regions 3000 or no-spray regions 4000 and recording travel path data transmitted from the GPS antenna system 1040 to the mobile device 1070, for instance as described in the '718 Patent, incorporated herein by reference, and overlaying that data with corresponding LiDAR sensed information 7078. In various example embodiments the steps of entering vehicle data into the one or more databases may comprise the steps of directing a vehicle, other than vehicle 2000, and having a second GPS antenna system (see the '718 Patent and the references discussed therein) and a second LiDAR sensing system 7000, along one or more edges 3500 of one or more spray regions 3000 or no-spray regions 4000 and recording travel path data 1078 transmitted from the second GPS antenna system 1040 to the mobile device 1070. In various example embodiments the steps of entering vehicle data into the one or more databases may comprise the steps of delineating one or more edges of one or more spray regions or no-spray regions on a GUI overlay of a digital image of a map, for instance as shown on pages 000063-000070 of the incorporated '139 Application. In various example embodiments the steps of entering vehicle data into the one or more databases may comprise the steps of delineating one or more edges of one or more spray regions or no-spray regions on a GUI overlay of a digital image of a map appearing on a screen 1071 of the mobile device 1070. In various example embodiments the steps of entering vehicle data into the one or more databases may comprise the steps of downloading at least a portion of the map data wirelessly 1074 from the cloud 5000 to the mobile device 1070.

In various example embodiments a method of using a vehicle 2000 as described herein may further comprise the steps of driving the vehicle 2000 proximate one or more edges 3500 of one or more spray regions 3000 or no-spray regions 4000 such that one or more of the plurality of spaced-apart nozzle assemblies 2230 are positioned sufficiently proximate a spray region 3000 while other of the plurality of spaced-apart nozzle assemblies 2230 are not positioned sufficiently proximate a spray region 3000, and thereby causing the mobile device 1070 to wirelessly communicate signals 1072 to the one or more controllers 1020 to individually turn on or allow flow of the liquid 2220 (in the form of a fog or mist) through each of the individual nozzle assemblies 2230 positioned proximate the one or more spray regions 3000, and to individually turn off or disallow flow of the liquid 2220 (in the form of a fog or mist) through each of the individual nozzle assemblies 2230 not positioned sufficiently proximate the one or more spray regions 3000.

In various example embodiments a method of using a vehicle 2000 as described herein may further comprise the steps of driving at least a portion of the vehicle 2000 over a boundary 3500 between a spray region 3000 and a no-spray region 4000 such that at the first time the plurality of spaced-apart nozzle assemblies 2230 are all positioned within a spray region 3000, and at the second time after the first time the plurality of spaced-apart nozzle assemblies 2230 are all positioned within a no spray region 3000, and thereby causing, at the first time, the mobile device 1070 to wirelessly communicate signals 1072 to the one or more controllers 1020 to individually turn on or allow flow of the liquid 2220 (in the form of a fog or mist) through each of the individual nozzle assemblies 2230, and causing, at the second time, the mobile device 1070 to wirelessly communicate signals 1072 to the one or more controllers 1020 to individually turn off or disallow flow of the liquid 2220 (in the form of a fog or mist) through each of the individual nozzle assemblies 2230.

In various example embodiments a method of using a vehicle 2000 as described herein may further comprise the steps of updating the map data in real-time during use of the vehicle 2000 and redefining the spray regions 3000 as no-spray regions 4000 as the spray regions 3000 are sprayed with the liquid 2220 (in the form of a fog or mist) by the vehicle 2000. In various example embodiments a method of using a vehicle 2000 as described herein may further comprise the steps of viewing on a display (also referred to as a screen) 1071 on the mobile device 1070 a digital image of a map of an area where the vehicle 2000 is located, and within that map area, one or more boundaries 3500 between the one or more spray regions 3000 and the one or more no-spray regions 4000, and also dynamically depicting in real-time those portions of the map area which have been sprayed with the liquid 2220 (in the form of a fog or mist) by the spraying system 2200 and those portions of the map area which have not been sprayed with the liquid 2220 (in the form of a fog or mist) by the spraying system 2200 for instance as discussed and shown on pages 000088-000099 of the incorporated '139 Application.

Any of the suitable technologies, materials, and designs set forth and incorporated herein may be used to implement various example aspects of the invention as would be apparent to one of skill in the art. Example embodiments of the present invention may optionally be implemented in combination with one or more aspects of the Intelligent Control Apparatus, System, and Method of Use discussed in U.S. Pat. No. 9,851,718 B2 to Steven R. Booher and issued Dec. 26, 2017 ("the '718 Patent"), the entirety of which is incorporated herein by reference. For example and not by way of limitation, the entering of boundary data by directing a GPS equipped vehicle around the desired boundaries as described in the '718 Patent, and the description of the Example Electronics Hardware in the '718 Patent, may be applied to the present disclosure. Additionally, the features described in the incorporated '457 Application may be incorporated into a vehicle 2000 as described herein, and the corresponding components described in the '457 Application may be provided as part of kit 1000.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A kit configured to be added-on to a vehicle having a source of electrical power and an air-assisted agricultural spraying system comprising a tank for holding a liquid to be sprayed and a plurality of spaced-apart nozzle assemblies in liquid communication with the tank, the kit comprising:
   a plurality of pulse-width-modulated solenoids configured to be installed in fluid communication with and between the tank and the nozzle assemblies" is changed to "a plurality of pulse-width-modulated solenoids configured to be installed at the nozzle assemblies and in fluid communication with the nozzle assemblies and to selectably turn on and off and vary flow rate of the liquid through the nozzle assemblies when the plurality of pulse-width-modulated solenoids are installed in the ports;
   one or more controllers configured to be in electrical communication with the plurality of pulse-width-modulated solenoids and to electrically actuate the solenoids to selectably turn on and off and vary flow rate of the liquid through the nozzle assemblies when the plurality of pulse-width-modulated solenoids are installed in the ports;
   a first wiring harness configured to be attached to the vehicle and to electrically connect the one or more controllers with the plurality of pulse-width-modulated solenoids;
   a second wiring harness configured to be attached to the vehicle and to electrically connect the one or more controllers with the source of electrical power;
   a GPS antenna system;
   a third wiring harness configured to be attached to the vehicle and to electrically connect the GPS antenna system with the source of electrical power;
   a LiDAR sensing system;
   a fourth wiring harness configured to be attached to the vehicle and to electrically connect the LiDAR sensing system with the source of electrical power; and
   a device configured to be in communication with the GPS antenna system and the one or more controllers, and to be in data communication with the LiDAR sensing system, and further configured to:
      receive one or more inputs from a user defining user-selectable criteria for spraying;
      to receive geographic location and velocity information from the GPS antenna system;
      to process the geographic location and velocity information in view of one or more databases of information comprising:
         map data defining spray regions and no-spray regions;
         plant data corresponding to one or more of locations, heights, widths, shapes, and densities of plants located within the spray regions;
         vehicle data defining the locations of each of the nozzle assemblies relative to the locations of the GPS antenna system and the LiDAR sensing system when installed on the vehicle; and
      communicate on, off, and pulse-width modulating signals to the one or more controllers to individually turn on and off flow of the liquid through each of the individual nozzle assemblies based on whether each nozzle assembly is within a spray region or a no-spray region;
      to turn on or off or vary flow rate of the liquid through each of the nozzle assemblies based on at least one of the user-selectable criteria, velocity information, and the plant data corresponding to a portion of a plant proximate each nozzle assembly.

2. The kit of claim 1, wherein the LiDAR sensing system comprises a WiFi router configured to be in wireless communication with the device.

3. The kit of claim 1, wherein the LiDAR sensing system comprises a fan configured to blow debris away from at least a sensing portion of the LiDAR sensing system.

4. The kit of claim 1, wherein the user-selectable criteria for spraying comprises a vertical boundary where the controller is configured to turn off liquid flow through nozzle assemblies oriented to direct spray beyond a vertical boundary when installed on the vehicle.

5. The kit of claim 1, wherein a vertical boundary is selectable to be a function of the plant data corresponding to height of a plant.

6. The kit of claim 1, wherein the user-selectable criteria for spraying comprises one or more adjustments to the flow rate of the liquid through the nozzle assemblies as a function of the plant data corresponding to density of a plant.

7. The kit of claim 1, wherein the user-selectable criteria for spraying comprises one or more adjustments to the flow rate of the liquid through the nozzle assemblies as a function of changes in the plant data for a given plant over time.

8. A method of installing the kit of claim 1 on the vehicle of claim 1, comprising the steps of:
   providing the vehicle of claim 1;
   providing the kit of claim 1;
   installing the plurality of pulse-width-modulated solenoids in the ports;
   attaching the one or more controllers to the vehicle;
   connecting with the first wiring harness the one or more controllers with the plurality of pulse-width-modulated solenoids;

attaching the first wiring harness to the vehicle;
connecting with the second wiring harness the one or more controllers with the source of electrical power;
attaching the second wiring harness to the vehicle;
attaching the GPS antenna system with the vehicle;
connecting with the third wiring harness the GPS antenna system with the source of electrical power;
attaching the third wiring harness to the vehicle;
attaching the LiDAR sensing system to the vehicle;
connecting with the fourth wiring harness the LiDAR sensing system with the source of electrical power; and
attaching the fourth wiring harness to the vehicle.

9. The method of claim 8, further comprising the steps of:
entering map data into the one or more databases defining spray regions and no-spray regions.

10. The method of claim 9, wherein the step of entering map data into the one or more databases defining spray regions and no-spray regions comprises the steps of:
driving the vehicle along one or more edges of one or more spray regions or no-spray regions and recording travel path data transmitted from the GPS antenna system to the device.

11. The method of claim 9, wherein the step of entering map data into the one or more databases defining spray regions and no-spray regions comprises the steps of:
directing a vehicle, other than the vehicle of claim 1, and having a second GPS antenna system, along one or more edges of one or more spray regions or no-spray regions and recording travel path data transmitted from the second GPS antenna system to the device.

12. The method of claim 9, wherein the step of entering map data into the one or more databases defining spray regions and no-spray regions comprises the steps of:
delineating one or more edges of one or more spray regions or no-spray regions on a GUI overlay of a digital image of a map.

13. The method of claim 9, wherein the step of entering map data into the one or more databases defining spray regions and no-spray regions comprises the steps of:
downloading at least a portion of the map data to the device.

14. The method of claim 9, further comprising the steps of:
inputting into the device user-selectable criteria for spraying; and
entering the plant data into the one or more databases corresponding to one or more of locations, heights, widths, shapes, and densities of plants located within the spray regions.

15. The method of claim 14, wherein the step of entering the plant data into the one or more databases corresponding to one or more of locations, heights, widths, shapes, and densities of plants located within the spray regions comprises the steps of:
driving the vehicle proximate plants within one of the spray regions and recording travel path data transmitted from the GPS antenna system to the device while also recording the plant data transmitted from the LiDAR sensing system to the device.

16. The method of claim 14, wherein the step of entering the plant data into the one or more databases corresponding to one or more of locations, heights, widths, shapes, and densities of plants located within the spray regions comprises the steps of:
directing a vehicle, other than the vehicle of claim 1, and having a second GPS antenna system and a second LiDAR sensing system, proximate plants within one of the spray regions and recording travel path data transmitted from the second GPS antenna system to the mobile device while also recording the plant data transmitted from the second LiDAR sensing system to the mobile device.

17. The method of claim 14, wherein the step of entering the plant data into the one or more databases corresponding to one or more of locations, heights, widths, shapes, and densities of plants located within the spray regions comprises the steps of:
delineating the plant data within a spray region on a GUI overlay of a digital image of a map.

18. The method of claim 14, wherein the step of entering the plant data into the one or more databases corresponding to one or more of locations, heights, widths, shapes, and densities of plants located within the spray regions comprises the steps of:
downloading at least a portion of the plant data to the device.

19. The method of claim 14, wherein the step of inputting into the device user-selectable criteria for spraying comprises the steps of:
selecting a vertical boundary so that the controller is configured to turn off liquid flow through nozzle assemblies oriented to direct spray beyond the vertical boundary.

20. The method of claim 19, wherein the vertical boundary is selected to be a function of the plant data corresponding to height of a plant.

21. The method of claim 14, wherein the step of inputting into the device user-selectable criteria for spraying comprises the steps of:
selecting one or more adjustments to the flow rate of the liquid through the nozzle assemblies as a function of the plant data corresponding to density of a plant.

22. The method of claim 14, wherein the step of inputting into the device user-selectable criteria for spraying comprises the steps of:
selecting one or more adjustments to the flow rate of the liquid through the nozzle assemblies as a function of changes in the plant data for a given plant over time.

23. A vehicle having a source of electrical power and an air-assisted agricultural spraying system comprising:
a tank for holding a liquid to be sprayed;
a plurality of spaced-apart nozzle assemblies in liquid communication with the tank, each nozzle assembly comprising a pulse-width-modulated solenoid configured to selectably turn on and off and vary flow rate of the liquid through the nozzle assembly;
one or more controllers in electrical communication with the plurality of pulse-width modulated solenoids and configured to electrically actuate the solenoids to selectably turn on and off and vary flow rate of the liquid through the nozzle assemblies;
a first wiring harness attached to the vehicle and electrically connecting the one or more controllers with the plurality of pulse-width-modulated solenoids;
a second wiring harness attached to the vehicle and electrically connecting the one or more controllers with the source of electrical power;
a GPS antenna system;
a third wiring harness attached to the vehicle and electrically connecting the GPS antenna system with the source of electrical power;

a LiDAR sensing system;
a fourth wiring harness attached to the vehicle and electrically connecting the LiDAR sensing system with the source of electrical power; and
a device configured to be in communication with the GPS antenna system and the one or more controllers, and to be in data communication with the LiDAR sensing system, and further configured to:
  receive one or more inputs from a user defining user-selectable criteria for spraying;
  to receive geographic location and velocity information from the GPS antenna system;
  to process the geographic location and velocity information in view of one or more databases of information comprising:
    map data defining spray regions and no-spray regions, and plant data corresponding to one or more of locations, heights, widths, shapes, and densities of plants located within the spray regions;
    vehicle data defining the locations of each of the nozzle assemblies relative to the locations of the GPS antenna system and the LiDAR sensing system when installed on the vehicle;
  based thereon wirelessly communicate on, off, and pulse-width modulating signals to the one or more controllers to individually turn on and off flow of the liquid through each of the individual nozzle assemblies based on whether each nozzle assembly is within a spray region or a no-spray region; and
  to turn on or off or vary flow rate of the liquid through each of the nozzle assemblies based on at least one of the user-selectable criteria, velocity information, and the plant data corresponding to a portion of a plant proximate each nozzle assembly.

24. The vehicle of claim 23, wherein the device is configured to update the plant data in real-time during use of the vehicle to update one or more of locations, heights, widths, shapes, and densities of plants located within the spray regions as the spray regions are sprayed by the vehicle.

25. The vehicle of claim 23, further comprising bracketry attaching the device with the vehicle near a driver's location on the vehicle, and a fifth wiring harness attached to the vehicle and electrically connecting the device with the source of electrical power.

26. The vehicle of claim 23, wherein the LiDAR sensing system comprises a WiFi router configured to be in wireless communication with the mobile device.

27. The vehicle of claim 23, wherein the LiDAR sensing system comprises a fan configured to blow debris away from at least a sensing portion of the LiDAR sensing system.

28. A kit configured to be added-on to a vehicle having a source of electrical power and an air-assisted agricultural spraying system comprising a tank for holding a liquid to be sprayed and a plurality of spaced-apart nozzle assemblies in liquid communication with the tank, the kit comprising:
  a plurality of pulse-width-modulated solenoids configured to be installed in fluid communication with the nozzle assemblies and to selectably turn on and off and vary flow rate of the liquid through the nozzle assemblies when the plurality of pulse-width-modulated solenoids are installed in fluid communication with the nozzle assemblies;
  one or more controllers configured to be in electrical communication with the plurality of pulse-width-modulated solenoids and to electrically actuate the solenoids to selectably turn on and off and vary flow rate of the liquid through the nozzle assemblies when the plurality of pulse-width-modulated solenoids are installed in the ports;
  a first wiring harness configured to be attached to the vehicle and to electrically connect the one or more controllers with the plurality of pulse-width-modulated solenoids;
  a second wiring harness configured to be attached to the vehicle and to electrically connect the one or more controllers with the source of electrical power;
  a GPS antenna system;
  a third wiring harness configured to be attached to the vehicle and to electrically connect the GPS antenna system with the source of electrical power;
  a LiDAR sensing system;
  a fourth wiring harness configured to be attached to the vehicle and to electrically connect the LiDAR sensing system with the source of electrical power; and
  a device configured to be in communication with the GPS antenna system and the one or more controllers, and to be in data communication with the LiDAR sensing system, and further configured to:
    receive one or more inputs from a user defining user-selectable criteria for spraying;
    to receive geographic location and velocity information from the GPS antenna system;
    to process the geographic location and velocity information in view of one or more databases of information comprising:
      map data defining spray regions and no-spray regions;
      plant data corresponding to one or more of locations, heights, widths, shapes, and densities of plants located within the spray regions; and
      vehicle data defining the locations of each of the nozzle assemblies relative to the locations of the GPS antenna system and the LiDAR sensing system when installed on the vehicle; and
    based thereon communicate on, off, and pulse-width modulating signals to the one or more controllers to individually turn on and off flow of the liquid through each of the individual nozzle assemblies based on whether each nozzle assembly is within a spray region or a no-spray region; and
    to turn on or off or vary flow rate of the liquid through each of the nozzle assemblies based on at least one of the user-selectable criteria, velocity information, and the plant data corresponding to a portion of a plant proximate each nozzle assembly.

29. A method of installing the kit of claim 28 on the vehicle of claim 28, comprising the steps of:
  providing the vehicle of claim 28;
  providing the kit of claim 28;
  installing the plurality of pulse-width-modulated solenoids in fluid communication with the nozzle assemblies;
  attaching the one or more controllers to the vehicle;
  connecting with the first wiring harness the one or more controllers with the plurality of pulse-width-modulated solenoids;
  attaching the first wiring harness to the vehicle;
  connecting with the second wiring harness the one or more controllers with the source of electrical power;
  attaching the second wiring harness to the vehicle;
  attaching the GPS antenna system with the vehicle;
  connecting with the third wiring harness the GPS antenna system with the source of electrical power;

attaching the third wiring harness to the vehicle;
attaching the LiDAR sensing system to the vehicle;
connecting with the fourth wiring harness the LiDAR sensing system with the source of electrical power;
attaching the fourth wiring harness to the vehicle;
entering the vehicle data into the one or more databases defining the locations of each of the nozzle assemblies relative to the locations of the GPS antenna system and the LiDAR sensing system when installed on the vehicle.

30. The kit of claim 1, the first wiring harness and the second wiring harness being part of a single wiring harness.

31. The kit of claim 1, the second wiring harness and the third wiring harness being part of a single wiring harness.

32. The kit of claim 1, the third wiring harness and the fourth wiring harness being part of a single wiring harness.

33. The kit of claim 1, the first wiring harness, the second wiring harness, and the third wiring harness being part of a single wiring harness.

\* \* \* \* \*

UNITED STATES PATENT AND TRADEMARK OFFICE
CERTIFICATE OF CORRECTION

PATENT NO. : 11,590,522 B2
APPLICATION NO. : 16/773352
DATED : February 28, 2023
INVENTOR(S) : Steven R. Booher, Gary A. Vandenbark and Mike Hilligoss It is certified that error appears in the above-identified patent and that said Letters Patent is hereby corrected as shown below:

In the Specification

Column 1 Line 26 under the heading "Federally Sponsored Research and Development":
Delete "None."
Insert --This patent may be related to US Government Contract 58-5082-8-014 under the US Department Of Agriculture. The US Government may retain certain rights thereunder.--

In the Claims

Column 21 Line 35 Claim 1:
Delete "a plurality of pulse-width-modulated solenoids configured to be installed in fluid communication with and between the tank and the nozzle assemblies"
Insert --a plurality of pulse-width-modulated solenoids configured to be installed at the nozzle assemblies and in fluid communication with the nozzle assemblies and to selectably turn on and off and vary flow rate of the liquid through the nozzle assemblies when the plurality of pulse-width-modulated solenoids are installed in the ports;...--

Signed and Sealed this
Tenth Day of September, 2024

Katherine Kelly Vidal
*Director of the United States Patent and Trademark Office*